(12) United States Patent
Rossi et al.

(10) Patent No.: US 9,827,710 B2
(45) Date of Patent: Nov. 28, 2017

(54) RADIUS FILLER AND METHOD OF MANUFACTURING SAME

(71) Applicant: The Boeing Company, Chicago, IL (US)

(72) Inventors: Angelo Rossi, Lynnwood, WA (US); Jeffery L. Marcoe, Bellevue, WA (US); Marc R. Matsen, Seattle, WA (US); Aaron W. Bartel, Mountlake Terrace, WA (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 14/171,779

(22) Filed: Feb. 4, 2014

(65) Prior Publication Data

US 2015/0217508 A1 Aug. 6, 2015

(51) Int. Cl.
| | | |
|---|---|---|
| *B29C 33/52* | (2006.01) | |
| *B29C 70/40* | (2006.01) | |
| *B29C 65/72* | (2006.01) | |
| *B29C 33/44* | (2006.01) | |
| *B29C 65/62* | (2006.01) | |
| *B29D 99/00* | (2010.01) | |
| *D04C 1/06* | (2006.01) | |
| *B29C 70/50* | (2006.01) | |
| *B29C 70/24* | (2006.01) | |

(Continued)

(52) U.S. Cl.
CPC ............ *B29C 65/72* (2013.01); *B29C 33/448* (2013.01); *B29C 65/62* (2013.01); *B29C 70/24* (2013.01); *B29C 70/504* (2013.01); *B29D 99/0003* (2013.01); *B29D 99/0007* (2013.01); *B29D 99/0014* (2013.01); *D04C 1/06* (2013.01); *B29B 11/16* (2013.01); *Y02T 50/433* (2013.01)

(58) Field of Classification Search
CPC ................ B29C 43/28; B29C 45/4457; B29C 2043/3668; B29C 53/822
USPC ............ 87/6, 7, 9, 30, 34, 41; 264/293, 294, 264/296, 313, 317
See application file for complete search history.

(56) References Cited

U.S. PATENT DOCUMENTS 3,409,961 A * 11/1968 Lemelson .............. B21D 53/04
29/33 R
3,530,029 A * 9/1970 Lemelson ............. B29C 44/306
156/79
4,559,262 A 12/1985 Cogswell et al.
(Continued)

FOREIGN PATENT DOCUMENTS

DE 102011018419 A1 * 10/2012 ............. B29C 70/22
DE 102011018420 A1 * 10/2012 ............. B29C 70/22
(Continued)

OTHER PUBLICATIONS

You et al. Enhancements in Performance and Manufacturing Efficiencies of GFRP Rebar. Journal of the Korea institute for structural maintenance and inspection. vol. 16, No. 1, 110-119, 2012.*

(Continued)

*Primary Examiner* — Atul P. Khare

(57) ABSTRACT

A method of manufacturing a radius filler may include providing a plurality of fibers, braiding the plurality of fibers into a braided preform, shaping the braided preform into a braided radius filler, and cutting the braided radius filler to a desired length.

20 Claims, 23 Drawing Sheets

(51) Int. Cl.
   *B32B 27/00* (2006.01)
   *B29B 11/16* (2006.01)

(56) References Cited

U.S. PATENT DOCUMENTS

| | | | | |
|---|---|---|---|---|
| 4,789,594 | A * | 12/1988 | Stawski | B26D 1/02 156/222 |
| 4,842,667 | A | 6/1989 | Thorsted, Jr. | |
| 4,892,764 | A * | 1/1990 | Drain | B29C 35/02 156/161 |
| 5,084,222 | A | 1/1992 | Glemet et al. | |
| 5,114,516 | A | 5/1992 | Pilling et al. | |
| 5,192,383 | A * | 3/1993 | Cavin | B29C 70/52 156/166 |
| 5,217,656 | A | 6/1993 | Buckley et al. | |
| 5,262,100 | A * | 11/1993 | Moore | B22C 1/167 164/132 |
| 5,338,497 | A | 8/1994 | Murray et al. | |
| 6,231,941 | B1 * | 5/2001 | Cundiff | B29C 70/083 428/36.3 |
| 6,264,868 | B1 * | 7/2001 | Marchant | B29C 33/52 264/221 |
| 6,395,210 | B1 * | 5/2002 | Head | B29C 70/525 264/137 |
| 6,562,436 | B2 | 5/2003 | George et al. | |
| 6,800,164 | B2 | 10/2004 | Brandstrom | |
| 6,955,732 | B1 | 10/2005 | Chan et al. | |
| 7,413,694 | B2 | 8/2008 | Waldrop, III et al. | |
| 8,440,045 | B2 * | 5/2013 | Bremmer | B29C 70/545 156/250 |
| 8,540,833 | B2 | 9/2013 | Deobald et al. | |
| 8,663,519 | B2 * | 3/2014 | Bechtold | B29C 70/22 264/136 |
| 9,314,941 | B2 * | 4/2016 | Wallen | B28B 7/346 |
| 2002/0056508 | A1 | 5/2002 | Brandstrom | |
| 2005/0059309 | A1 | 3/2005 | Tsotsis | |
| 2006/0130642 | A1 | 6/2006 | Tomich et al. | |
| 2007/0013096 | A1 | 1/2007 | Rekret | |
| 2007/0023975 | A1 | 2/2007 | Buckley | |
| 2009/0317587 | A1 | 12/2009 | Deobald et al. | |
| 2011/0088538 | A1 * | 4/2011 | Bechtold | B29C 70/22 87/1 |
| 2012/0228467 | A1 * | 9/2012 | Wallen | B28B 7/346 249/61 |
| 2012/0308817 | A1 * | 12/2012 | Ponsolle | B29C 70/222 428/365 |
| 2013/0134154 | A1 | 5/2013 | Matsen | |
| 2013/0309443 | A1 | 11/2013 | Deobald et al. | |
| 2013/0316131 | A1 * | 11/2013 | Oefner | B29D 99/0014 428/121 |

FOREIGN PATENT DOCUMENTS

| | | | | |
|---|---|---|---|---|
| DE | 102011018422 | A1 * | 10/2012 | B29C 70/523 |
| DE | 102011119245 | A1 * | 10/2012 | B29C 70/523 |
| DE | 102011100546 | A1 * | 11/2012 | B29C 70/523 |
| EP | 2666622 | A1 | 11/2013 | |
| WO | WO0003854 | A2 | 1/2000 | |
| WO | WO2012166263 | A1 | 12/2012 | |

OTHER PUBLICATIONS

Lam et al. Design Methodology of a Ductile Hybrid Kevlar-Carbon Reinforced Plastic for Concrete Structures by the Braidtrusion Process. Proceedings of the 13th International Conference on Composite Materials, 2001.*

Kalamkarov et al. Strain and deformation monitoring in infrastructure using embedded smart FRP reinforcements. Composites Part B 36, 455-467, 2005.*

Kalamkarov et al. Pultrusion of smart FRP composites. SPIE vol. 3042, 400-409, 1997.*

Corvaglia et al. Development and Some Investigative Testing of Smart Structural FRP Devices with Embedded Fiber Optic Sensor for Health Monitoring of Civil Structures. Advances in Structural Engineering, vol. 13, No. 5, 2010.*

Ahmadi et al. An experimental study on mechanical properties of GFRP braid-pultruded composite rods. eXPRESS Polymer Letters, vol. 3, No. 9, 560-568, 2009.*

Kalamkarov et al. Pultruded fibre reinforced polymer reinforcements with embedded fibre optic sensors. Can. J. Civ. Eng. 27, 972-984, 2000.*

Wikipedia, Pultrusion Article, last visited Nov. 14, 2011.

EPO, EP Extended Search Report for Serial No. 14191204.8, dated Oct. 7, 2015.

EPO, EP Partial Search Report for Serial No. 14191204.8, dated Jun. 12, 2015.

Norman Fleck et al., "On the Mechanics of Braided Composites in Tension," Eur. J. Mech. A/Solids 19 (2000) 259-275, dated Nov. 29, 1999.

Hoa Lam et al., "Composite Manufacturing by the Braidtrusion Process," Drexel University, 2001.

Wikipedia, "Chinese Finger Trap", retrieved on Oct. 7, 2013.

EPO, EP Search Report for Serial No. 14191204.8, dated Apr. 18, 2017.

* cited by examiner

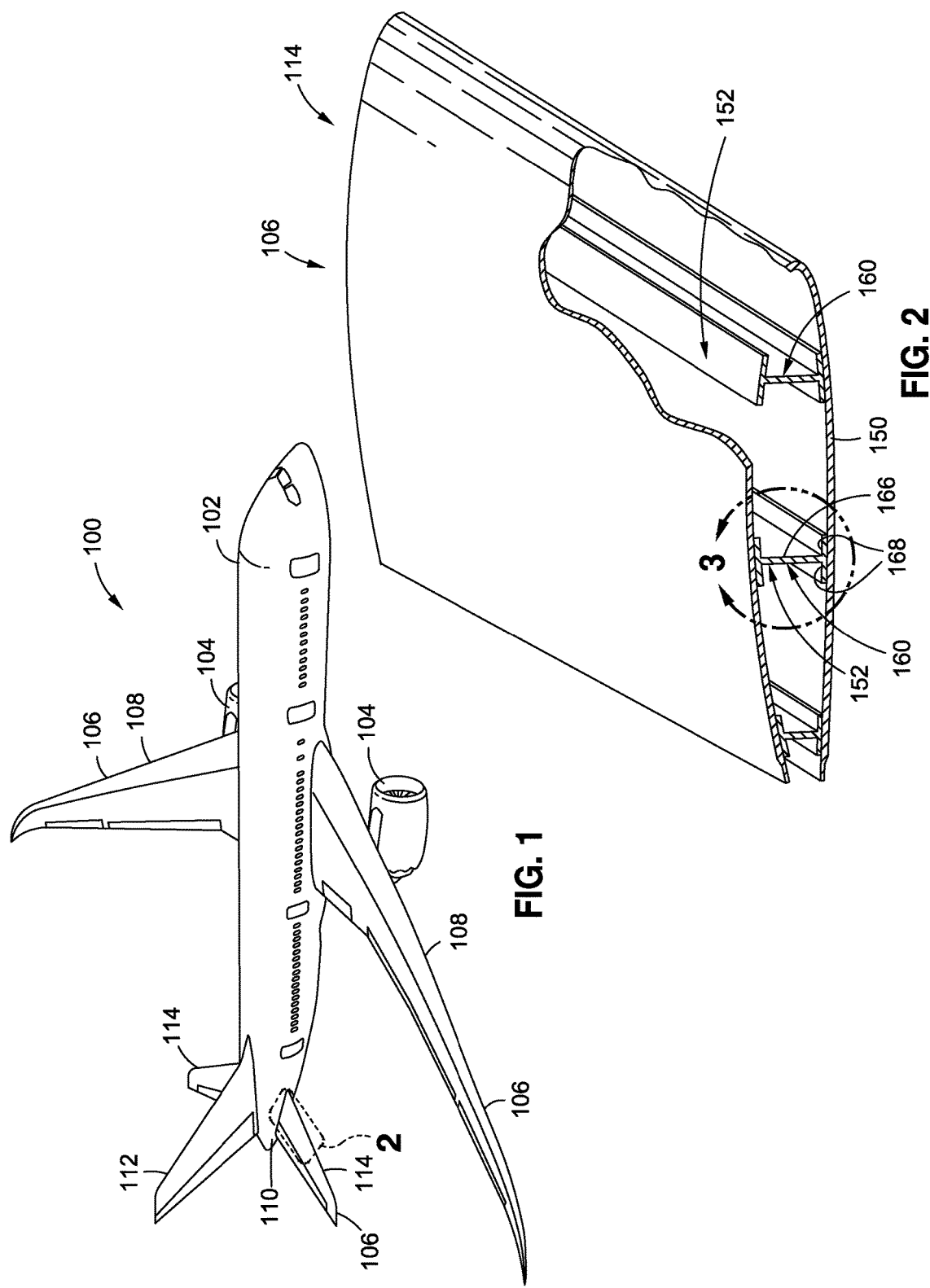

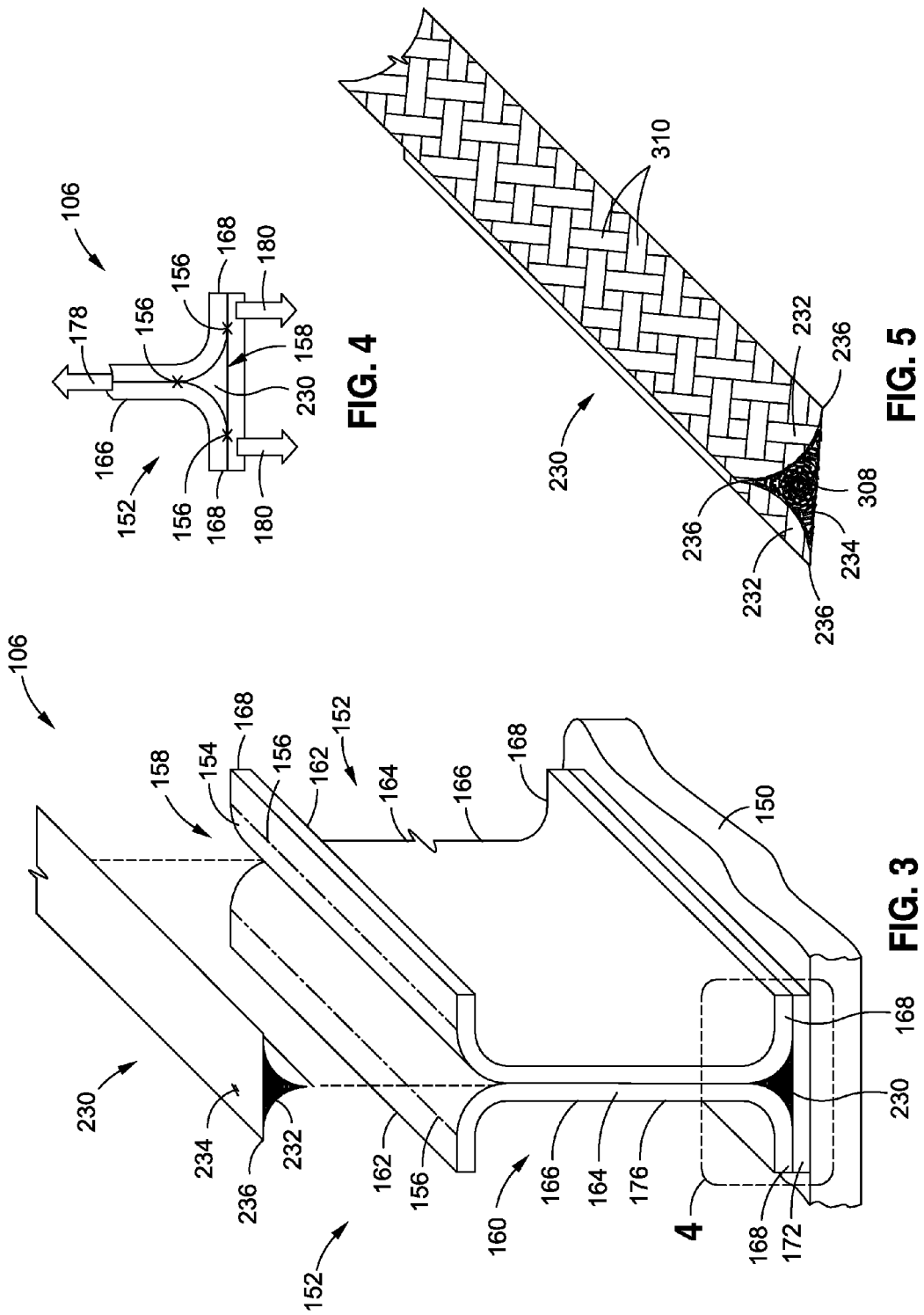

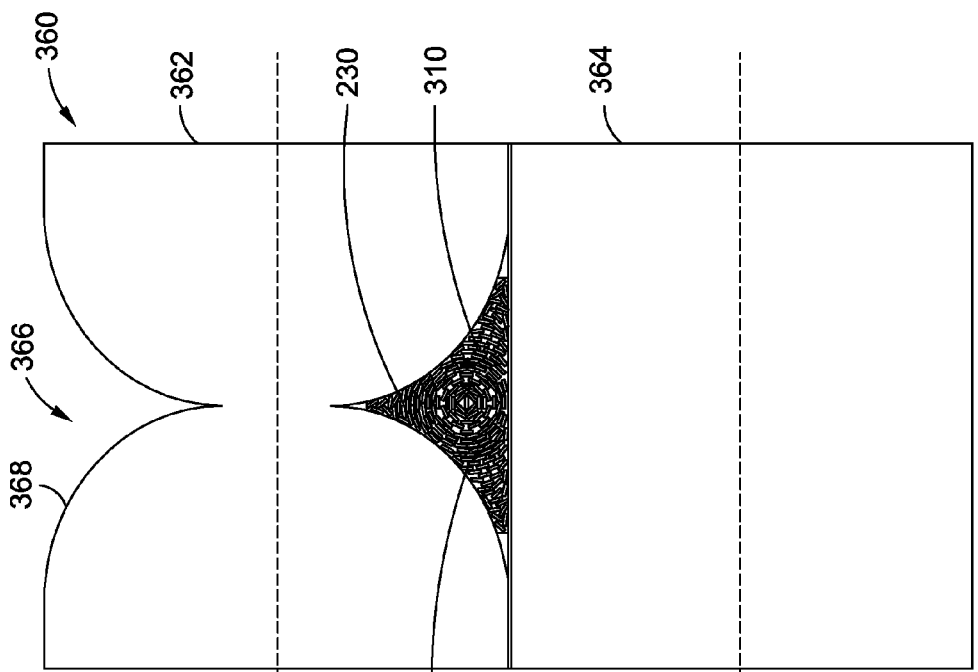
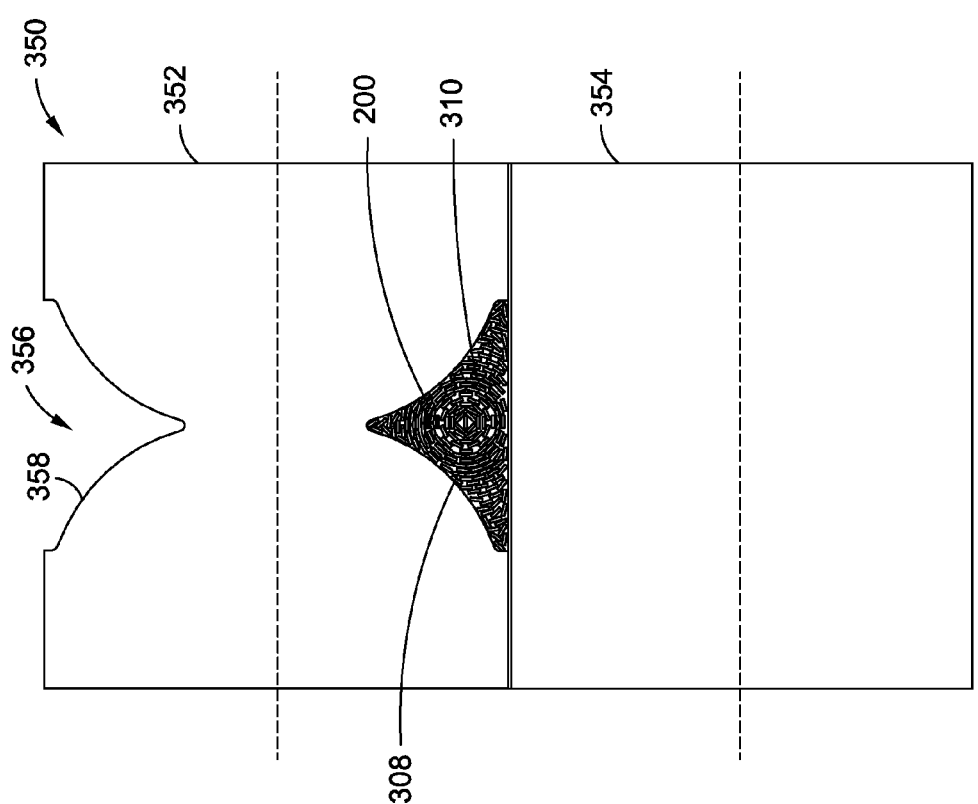

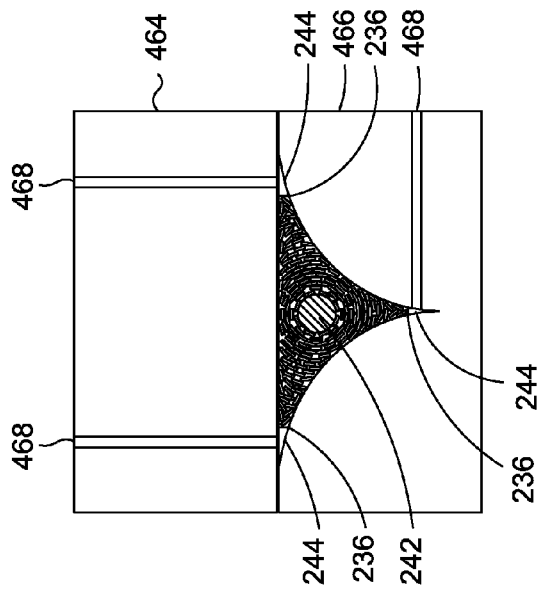
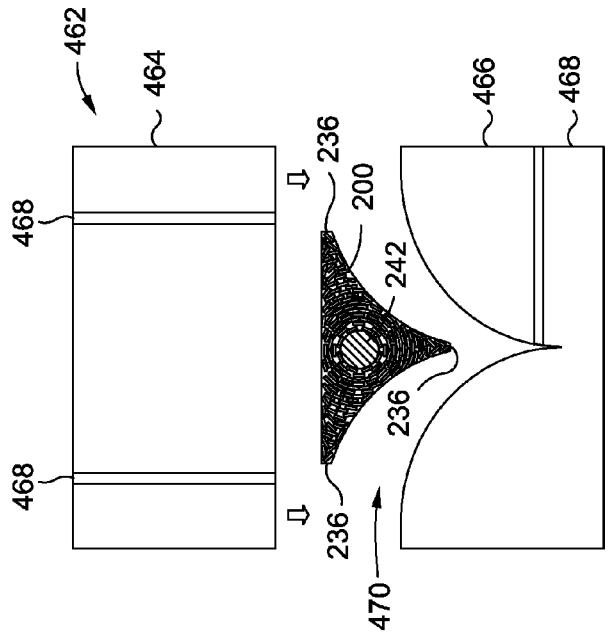
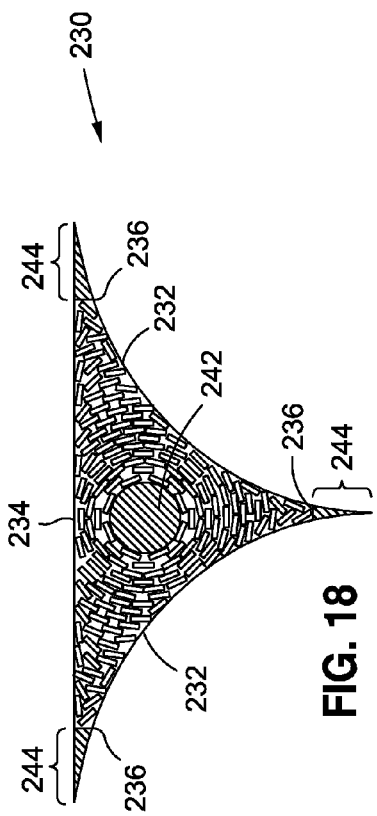
FIG. 16
FIG. 17
FIG. 18

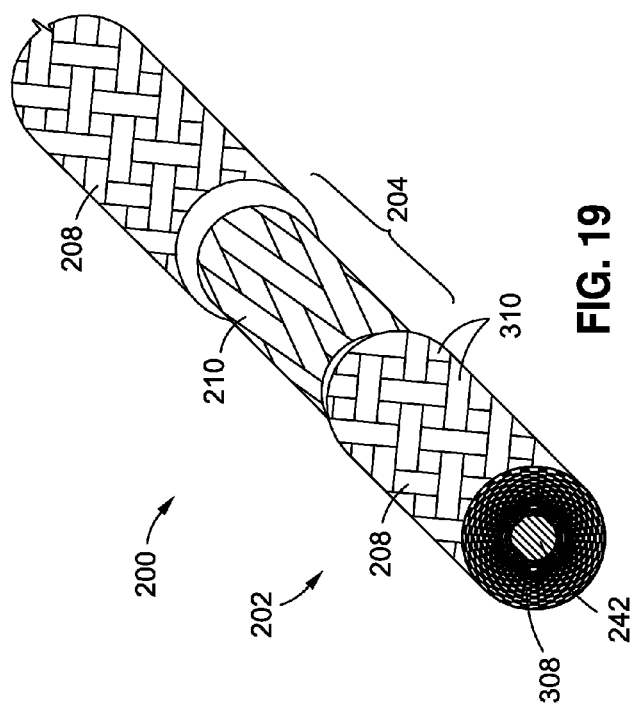
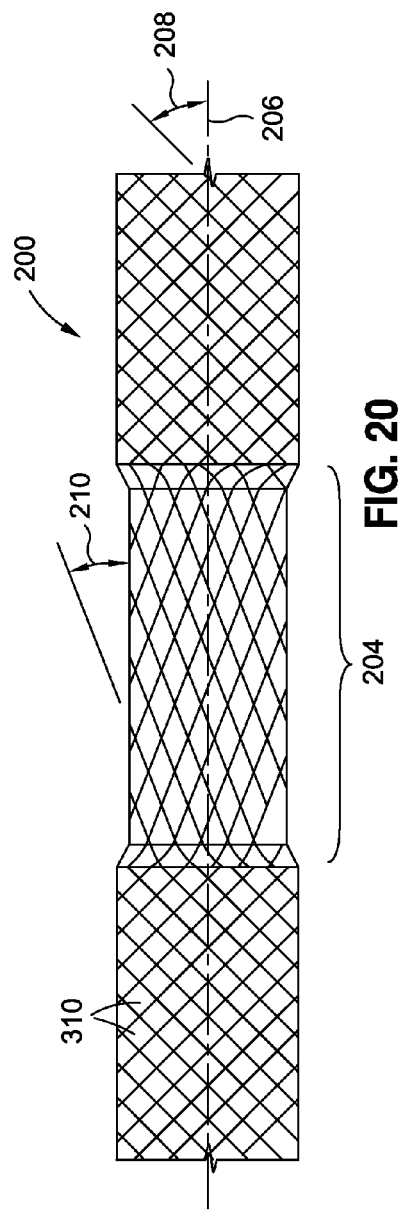

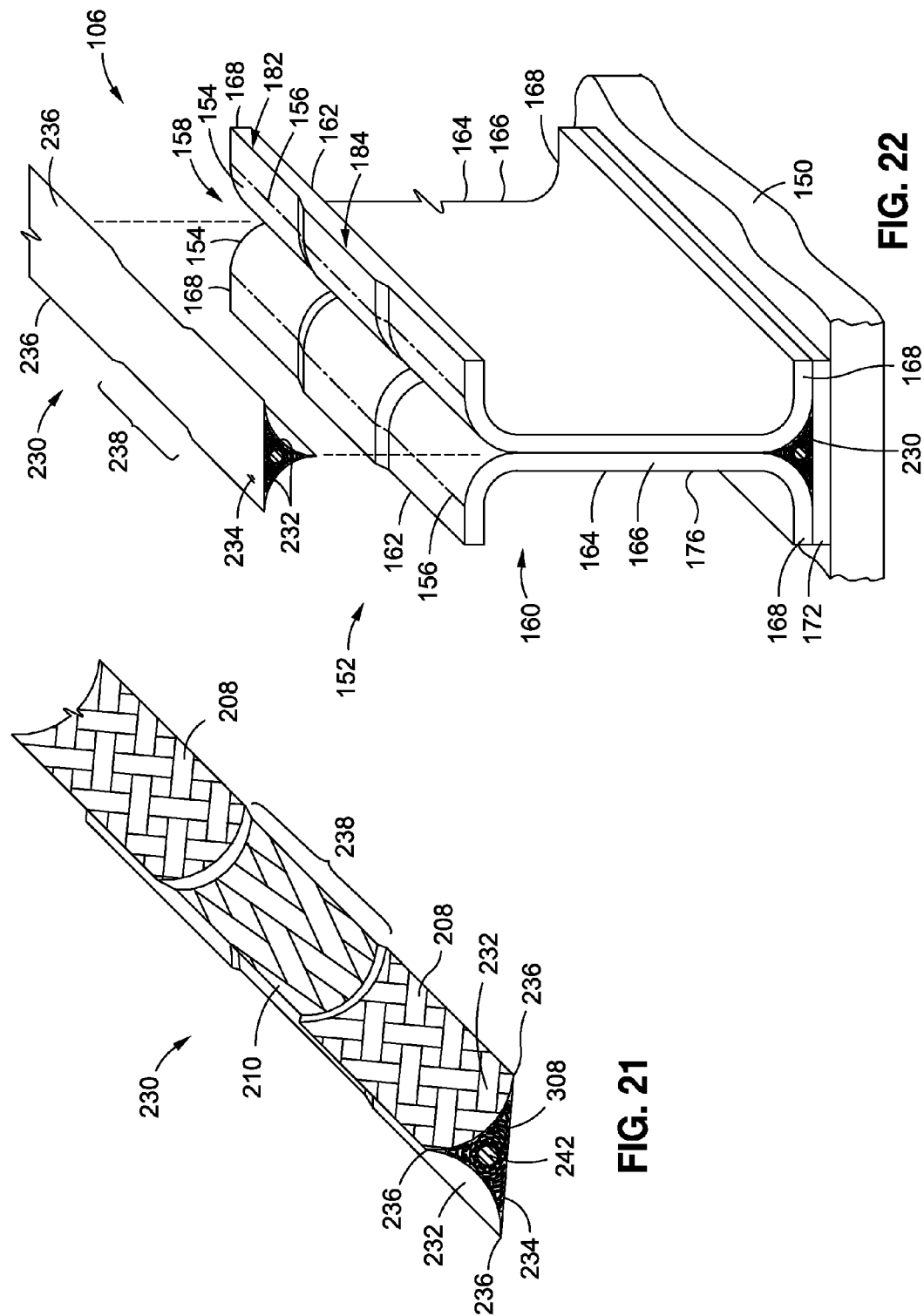

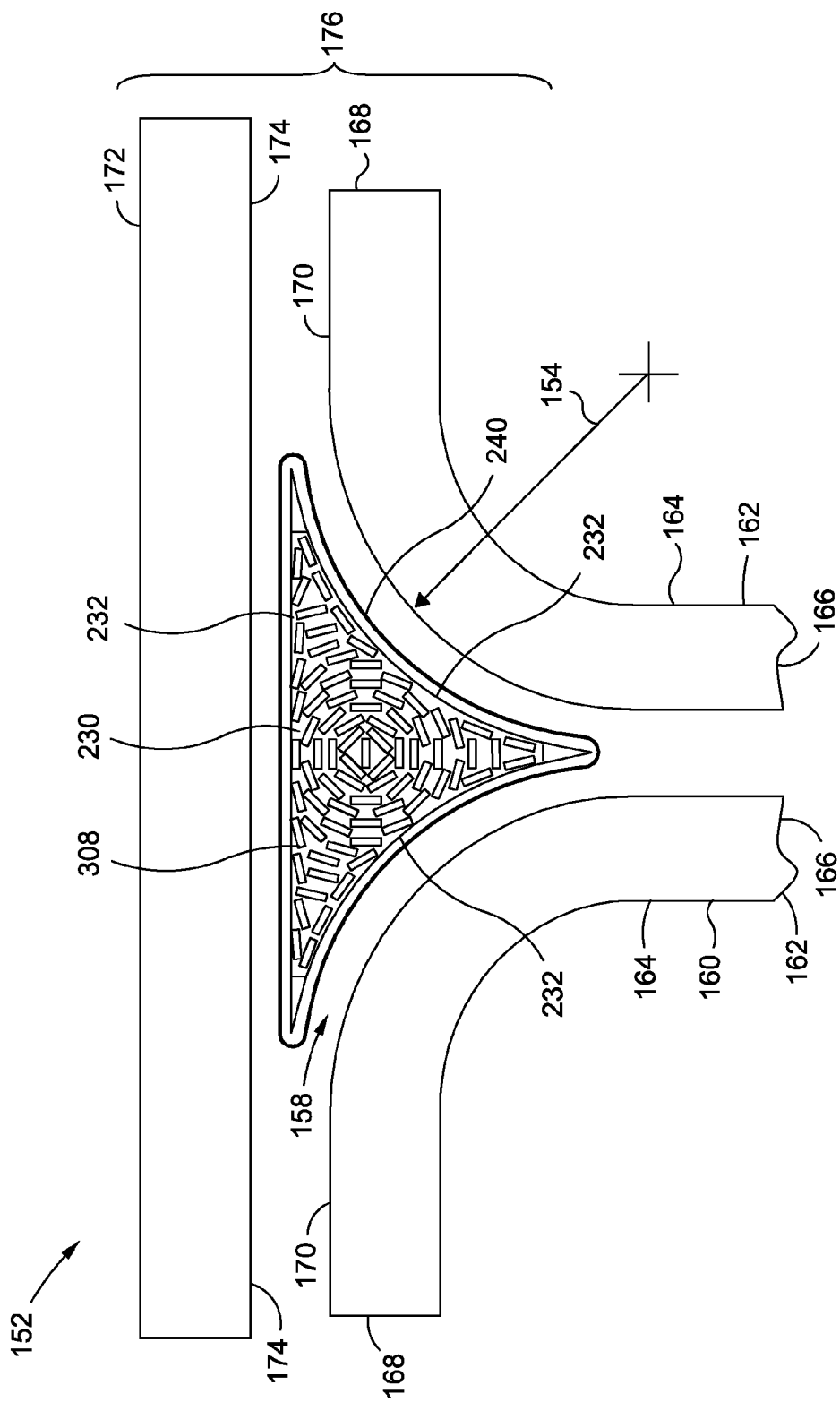

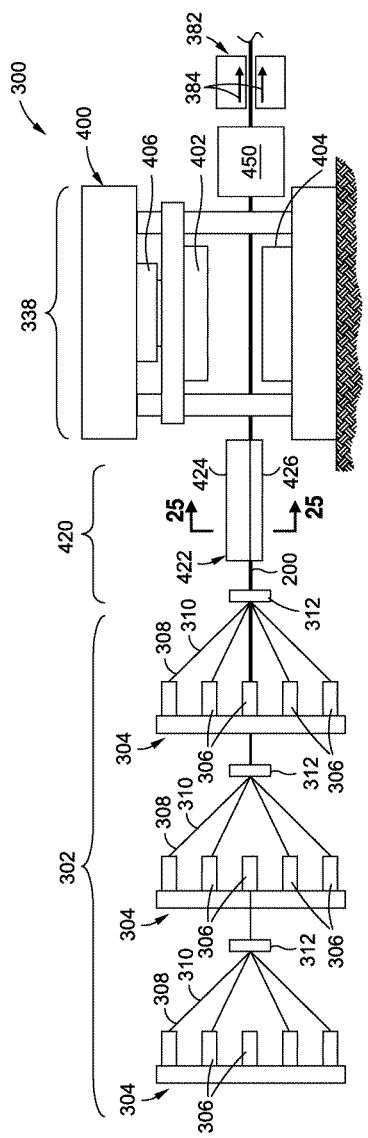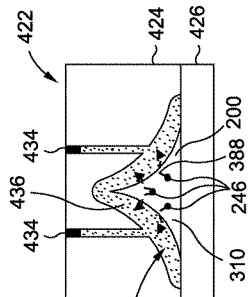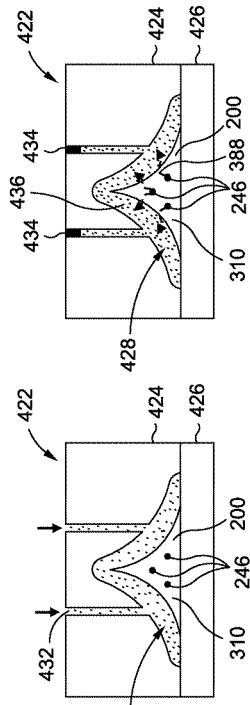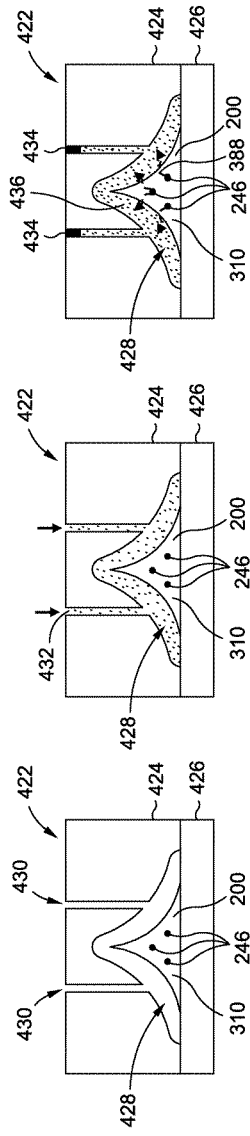
FIG. 24
FIG. 25
FIG. 26
FIG. 27

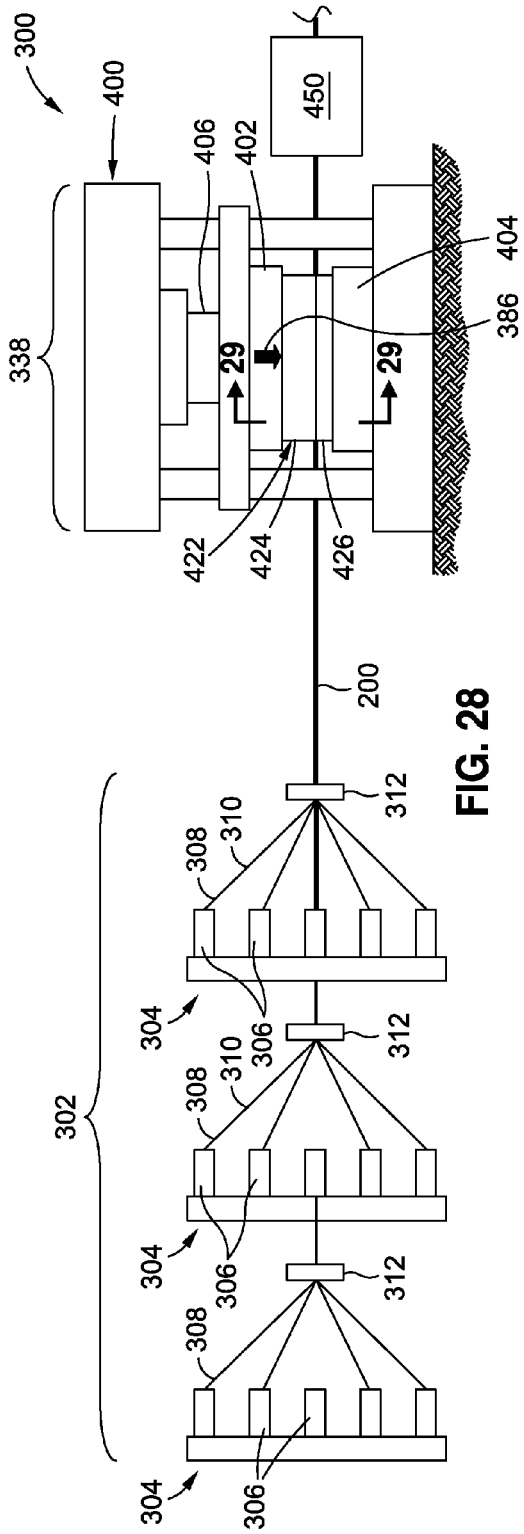
FIG. 28
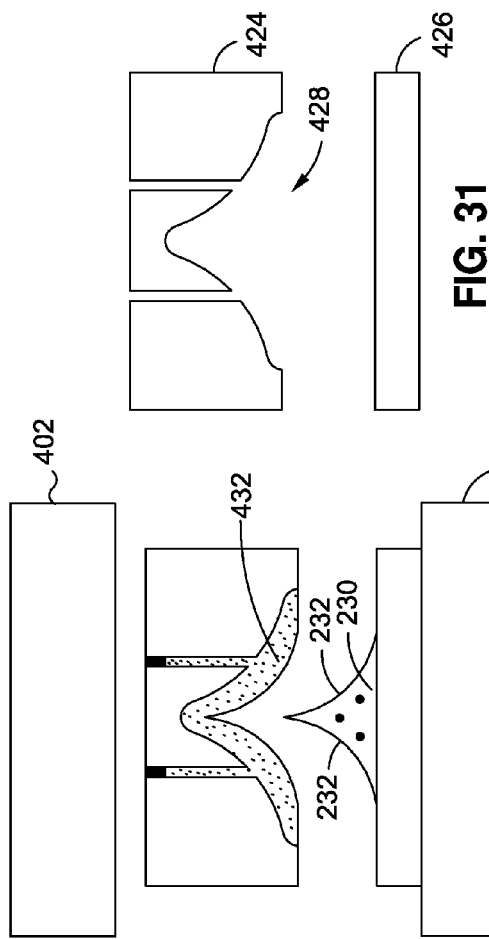
FIG. 30
FIG. 31
FIG. 29

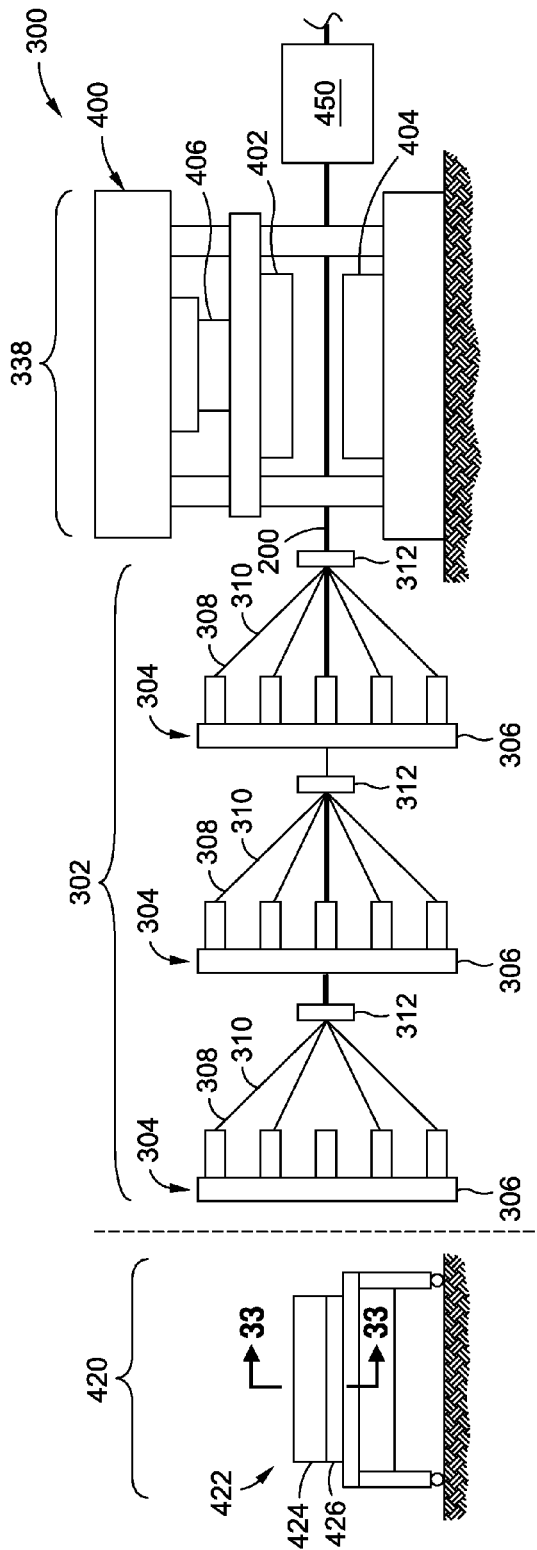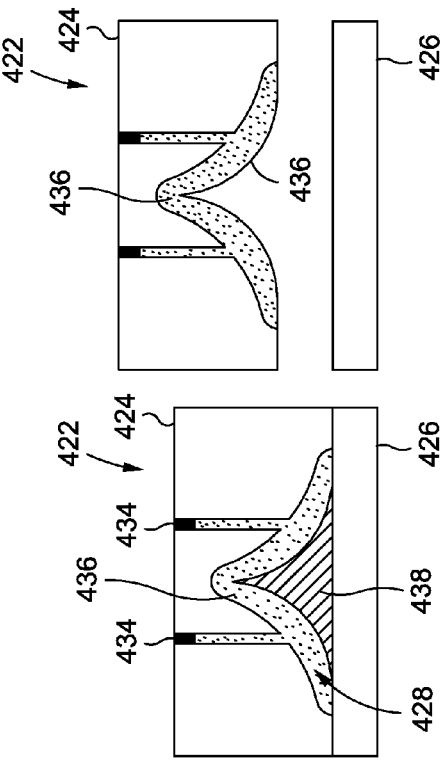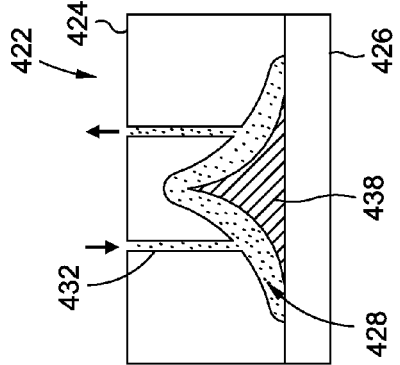
FIG. 32
FIG. 33
FIG. 34
FIG. 35
FIG. 36

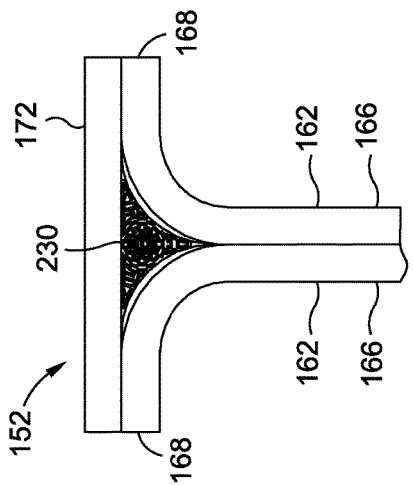
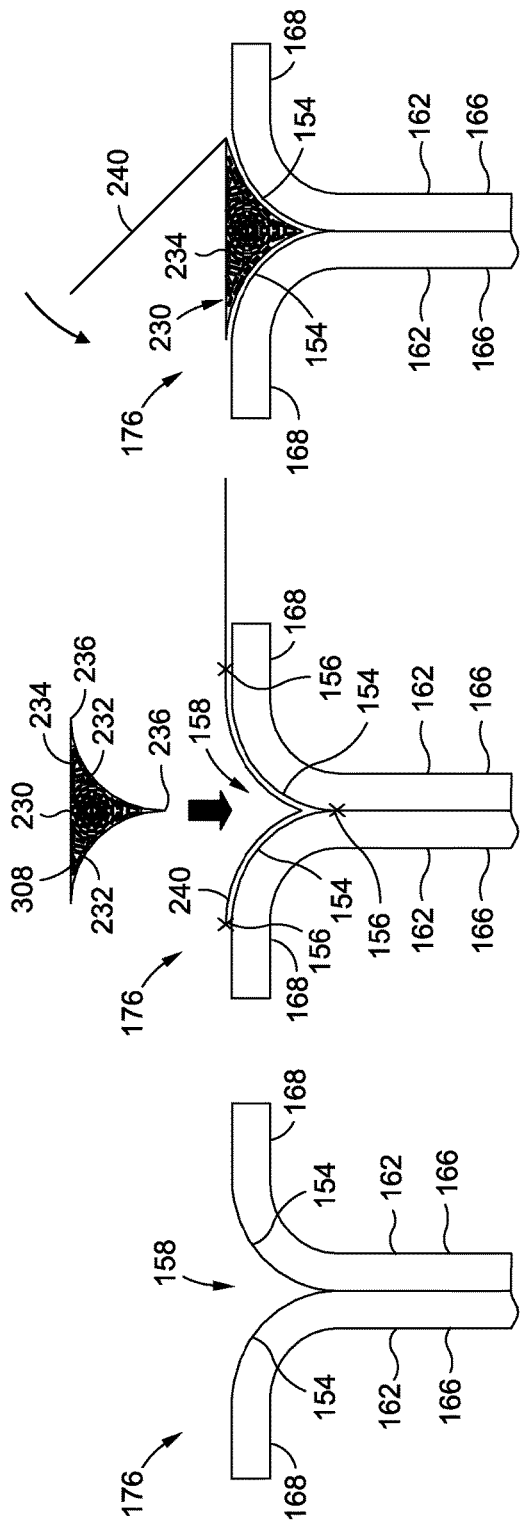
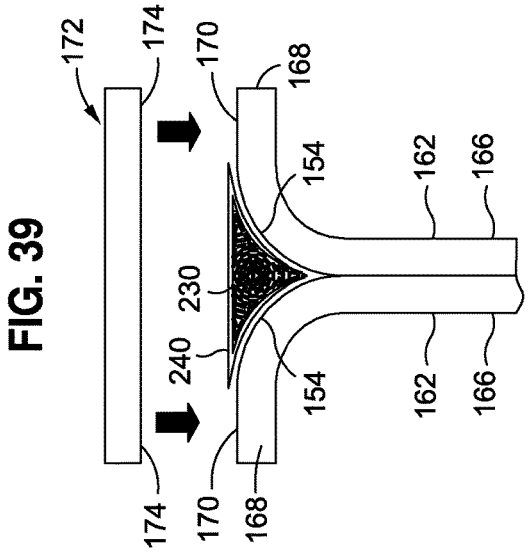

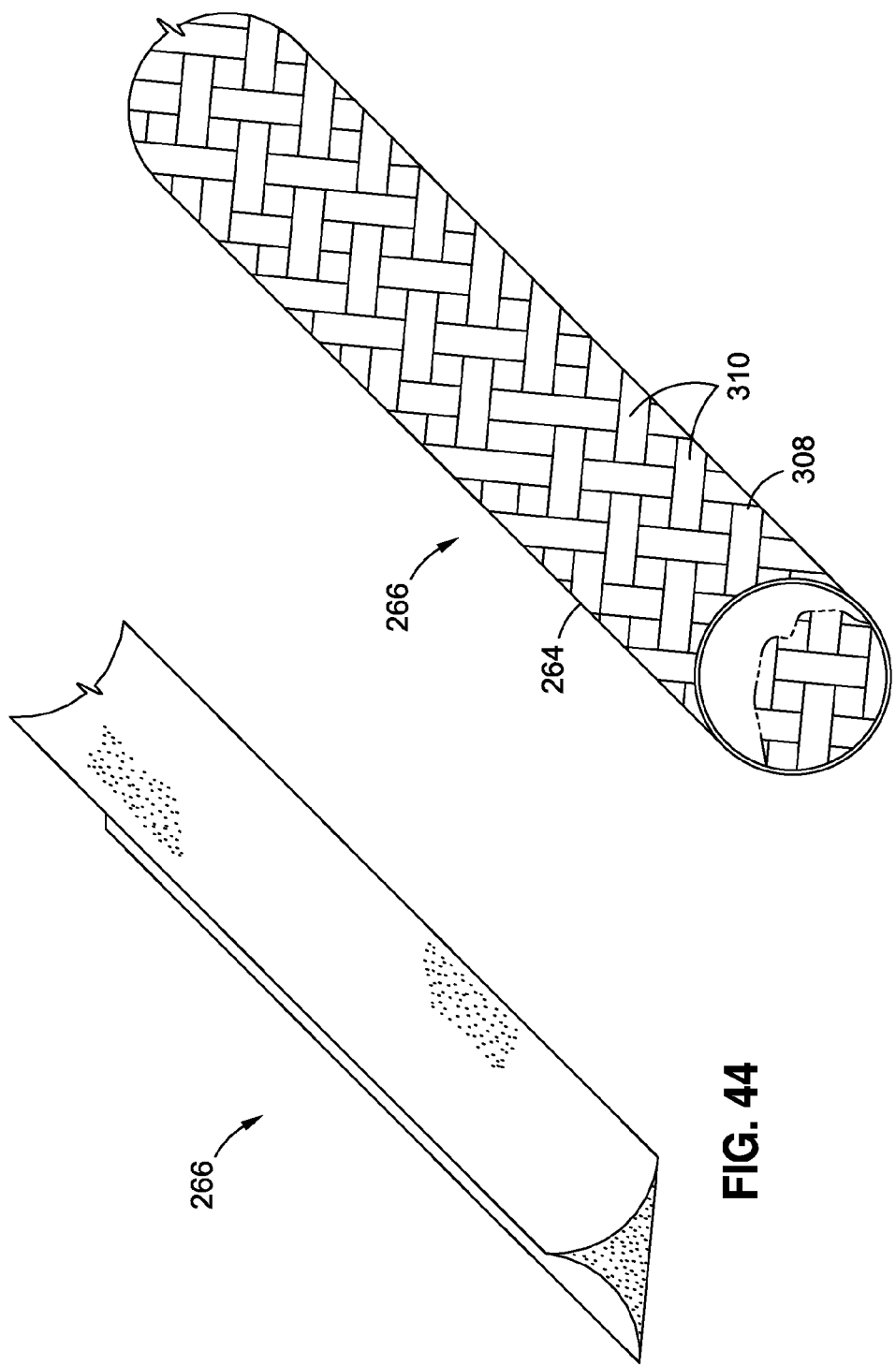

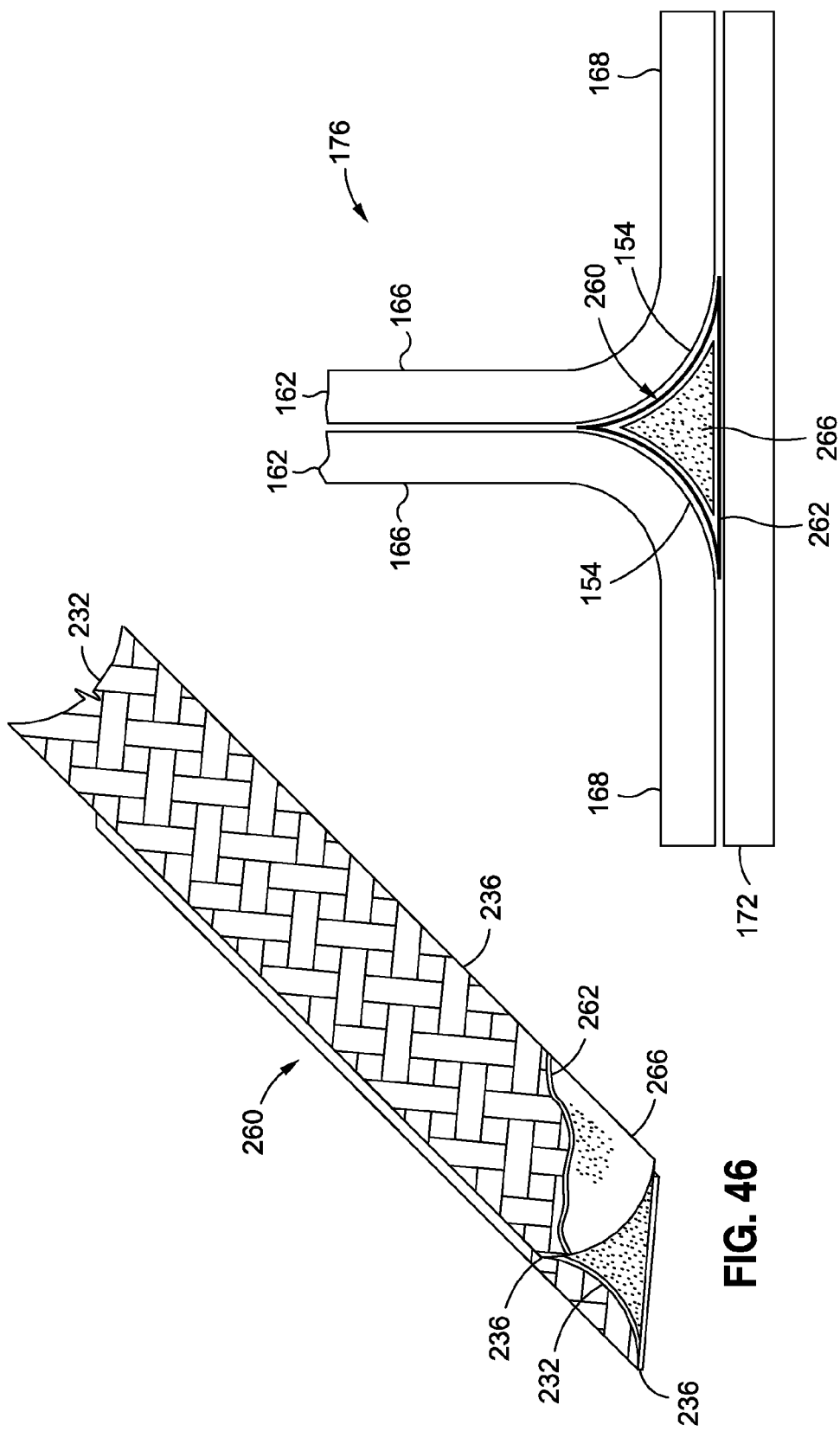

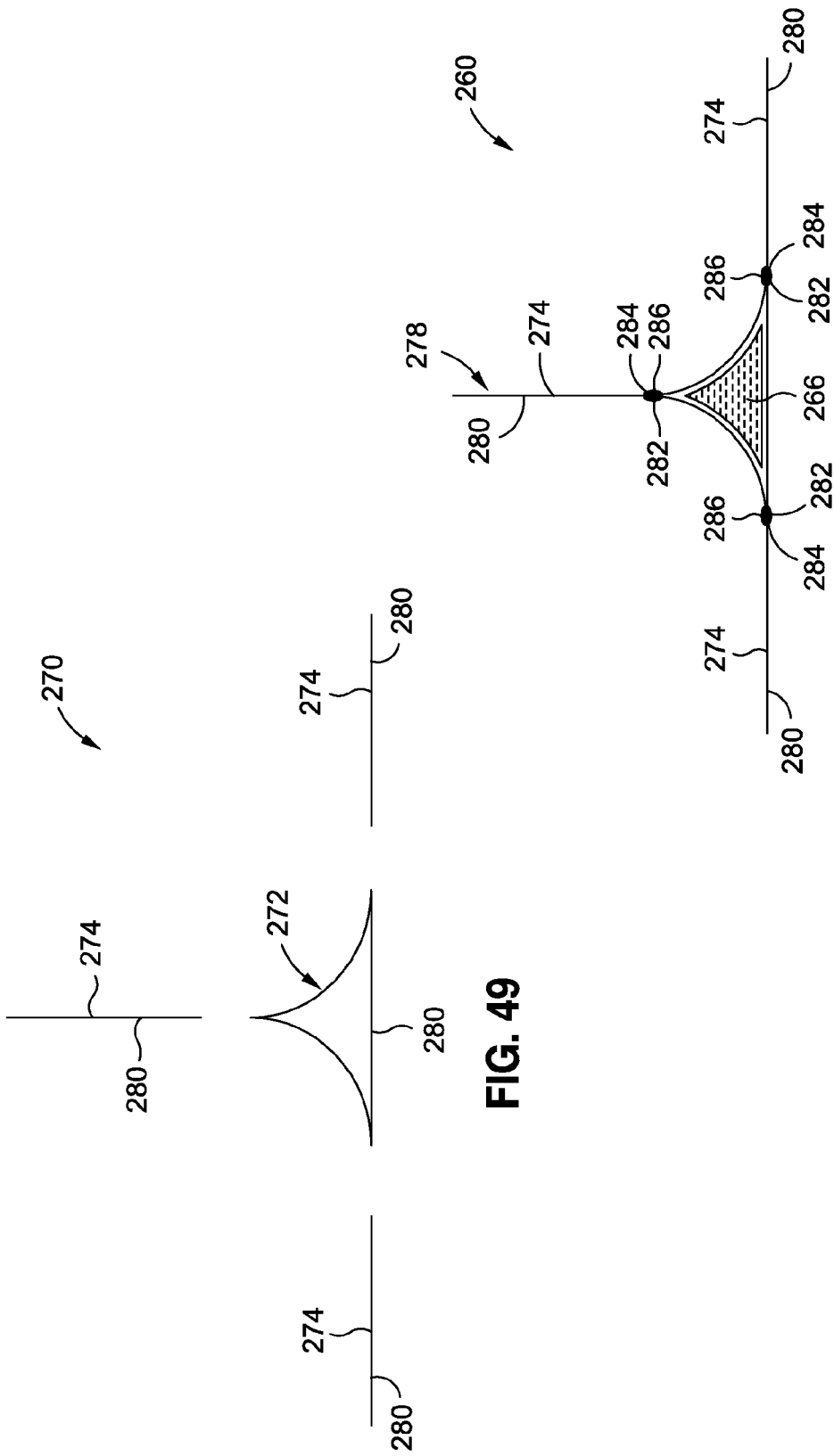

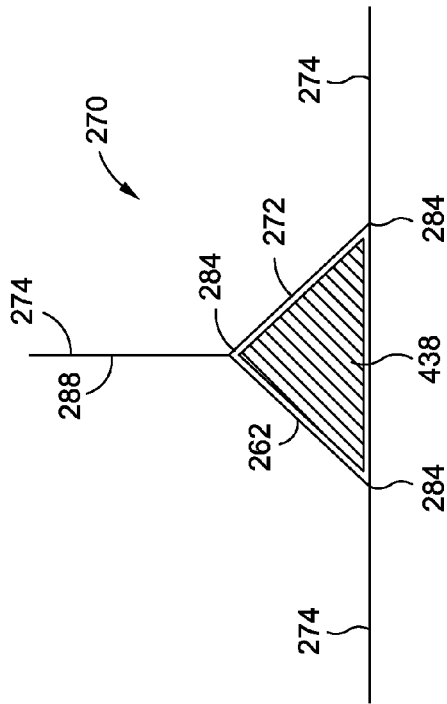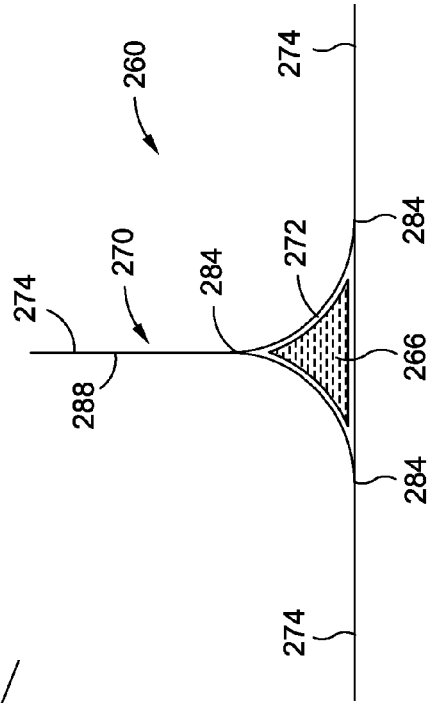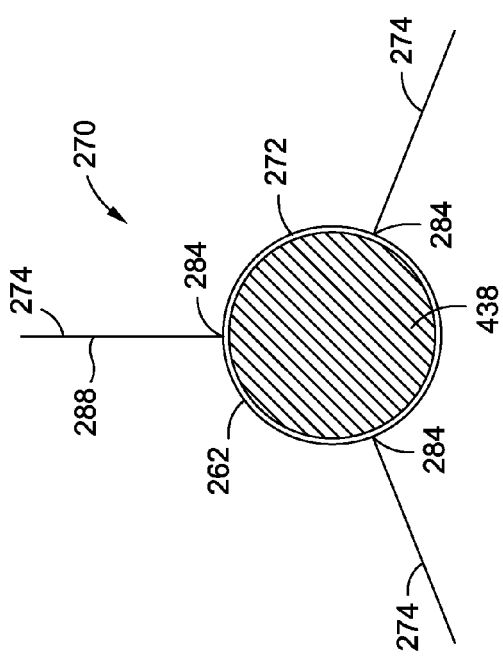

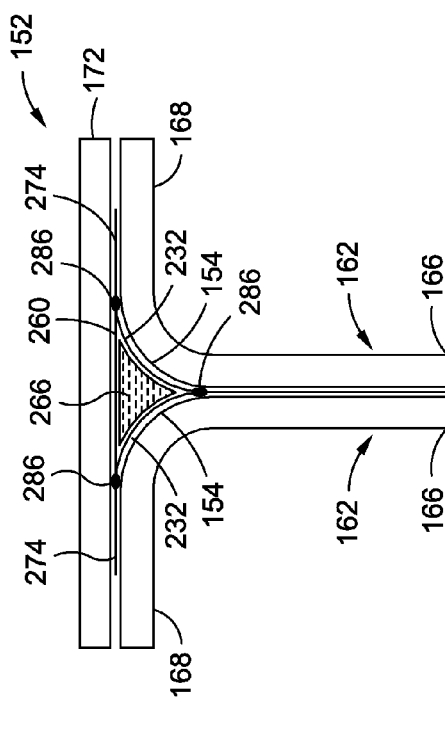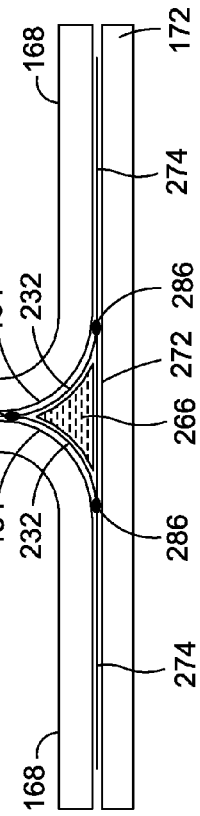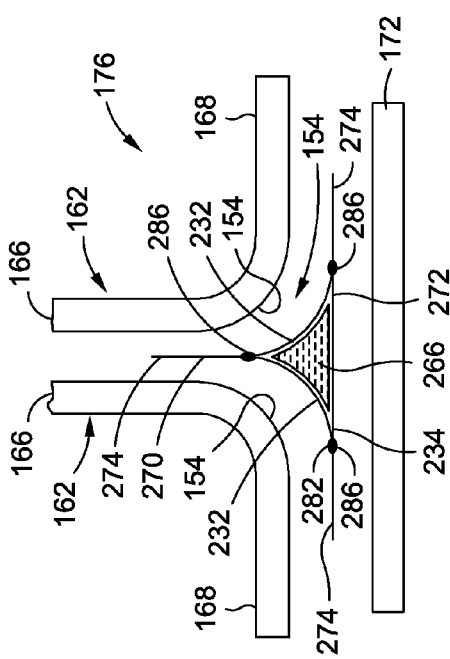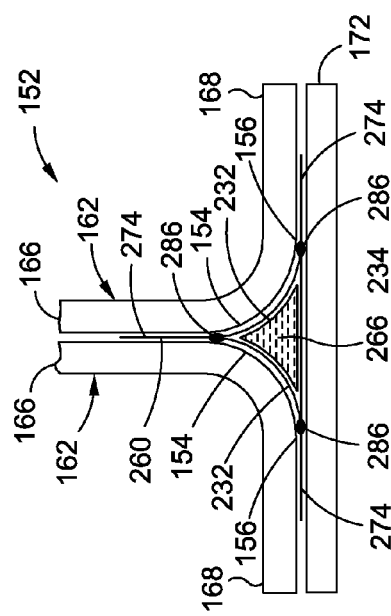

RADIUS FILLER AND METHOD OF MANUFACTURING SAME

FIELD

The present disclosure relates generally to composite structures and, more particularly, to composite radius fillers for composite structures, and methods for manufacturing the same.

BACKGROUND

Composite structures are used in a wide variety of applications due to their high strength-to-weight ratio, corrosion resistance, and other favorable properties. In aircraft construction, composites are used in increasing quantities to form the fuselage, wings, horizontal and vertical stabilizer, and other components. For example, the horizontal stabilizer of an aircraft may be formed of composite skin panels co-bonded or co-cured to internal composite structures such as composite stiffeners or spars. The composite spars may extend from the root to the tip of the horizontal stabilizer and may generally taper in thickness along a spanwise direction to improve the stiffness characteristics of the horizontal stabilizer and reduce weight.

Composite stiffeners or spars may be provided in a variety of cross-sectional shapes. For example, a composite spar or stiffener may be formed in an I-beam shape by bonding or curing together the vertical webs of two C-shaped composite channels in back-to-back arrangement. Each one of the C-shaped channels may have horizontal flanges extending outwardly from upper and lower ends of a web. Each horizontal flange may transition into the web at a radiused web-flange transition. When the C-shaped channels are joined back-to-back to form the I-beam shaped stiffener, the radiused web-flange transitions result in a lengthwise notch along the upper and lower ends of the I-beam stiffener. The lengthwise notches may be referred to as radius filler regions or noodle regions. To improve the strength, stiffness, and durability of a composite structure, radius filler regions may be filled with radius fillers or noodles formed of composite material.

Unfortunately, existing radius fillers suffer from several drawbacks that detract from their utility. For example, existing radius fillers may exhibit cracking due to residual stress that may occur during the manufacturing process such as during cool-down from curing. The residual stress may occur as a result of a thermal mismatch between the radius filler and the adjacent composite laminates surrounding the radius filler. In addition, certain radius fillers may result in sub-optimal pull-off strength at the bond between the stiffener and the skin panel under structural loading.

As can be seen, there exists a need in the art for a radius filler that minimizes cracking during the composite manufacturing process and which provides favorable pull-off strength and which can be manufactured in a timely and cost-effective manner

SUMMARY

The above-noted needs associated with joining composite components are specifically addressed by the present disclosure which provides a method of manufacturing a radius filler or noodle. The method may include providing a plurality of fibers, and braiding the plurality of fibers into a braided preform. The method may further include shaping the braided preform into a braided radius filler, and cutting the braided radius filler to a desired length. As described in greater detail below, in some examples, the fibers may be reinforcing fibers (e.g., carbon fibers, glass fibers, Kevlar® fibers, etc.) to which resin or matrix material may be applied. The matrix material may be a thermosetting matrix material (e.g., epoxy) or a thermoplastic matrix material (e.g., polyetherketoneketone, polyetheretherketone, etc.). In some examples, the fibers may include reinforcing fibers braided with thermoplastic fibers that may melt when heated to infuse with the reinforcing fibers, as described below. In other examples, the fibers may comprise only thermoplastic fibers that may be braided together and which may melt and fuse together during the process of heating, shaping, and solidifying the radius filler.

Also disclosed is a method of fabricating a composite structure. The method may include mounting a braided radius filler in a radius filler region between opposing stiffener laminates. The method may additionally include assembling a base laminate with the stiffener laminates to encapsulate the braided radius filler within the radius filler region and form a laminate assembly. The method may further include curing the laminate assembly by applying heat to form a composite structure.

In a further embodiment, disclosed is a method of manufacturing a radius filler. The method may include providing a radius filler core, and fabricating a sleeve. The method may additionally include covering the radius filler core with the sleeve to form a sleeved radius filler.

Also disclosed is a method of fabricating a composite structure. The method may include mounting a sleeved radius filler in the radius filler region between opposing stiffener laminates, and assembling a base laminate with the stiffener laminates to encapsulate the sleeved radius filler within the radius filler region to form a laminate assembly. The method may also include curing the laminate assembly by applying heat to form a composite structure.

Additionally disclosed is a radius filler for installing in a radius filler region of a laminate assembly. The radius filler may include a plurality of fibers encapsulated in resin and braided into a braided radius filler. The braided radius filler may have a generally triangular shape with concave radius filler side surfaces and a generally planar radius filler base surface.

Further disclosed is a radius filler. The radius filler may include a radius filler core. The radius filler may additionally include a sleeve covering the radius filler core. The sleeved radius filler may have opposing radius filler side surfaces and a radius filler base surface. The radius filler side surfaces may be concave. The radius filler base surface may be generally planar.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft;

FIG. 2 is a perspective view of a horizontal stabilizer taken along line 2 of FIG. 1;

FIG. 3 is a perspective view of a composite stiffener and a radius filler taken along line 3 of FIG. 2 and illustrating the installation of the radius filler within a radius filler region of the composite stiffener of FIG. 2;

FIG. 4 is a schematic diagram taken along line 4 of FIG. 3 and illustrating a pulloff load acting on an interface between stiffener laminates and a base laminate;

FIG. 5 is a perspective view of an embodiment of a braided radius filler;

FIG. 11 is a cross-sectional view of a second roller die set taken along line 11 of FIG. 7;

FIG. 12 is a cross-sectional view of a third roller die set taken along line 12 of FIG. 7;

FIG. 16 is a cross-sectional Figure of the final forming station taken along line 16 of FIG. 14 and showing the upper forming die and the lower forming die having adhesive fill ports and further illustrating an embodiment of a braided radius filler having an inner core;

FIG. 17 is a cross-sectional view of the final forming stations taken along line 17 of FIG. 15 and showing the injection of adhesive into the adhesive fill ports to form an adhesive tip on each one of the radius fill corners of the braided radius filler;

FIG. 18 is a cross-sectional view of the braided radius filler having an adhesive tip on each one of the radius fill corners;

FIG. 19 is a perspective view of a braided preform having a localized change in cross-sectional size due to a change in the biasing angle of the fibers;

FIG. 20 is a side view of the braided preform of FIG. 19 and illustrating the fibers formed at a first bias angle and a second bias angle (e.g., different bias angles) resulting in a region of localized change in the cross-sectional size of the braiding preform;

FIG. 21 is a perspective view of the braided radius filler in a final contoured shape having a localized decrease in cross-sectional size at a location corresponding to the localized change in cross-sectional size of the braided preform;

FIG. 22 is a perspective view of a braided radius filler during installation into a radius filler region defined by a pair of stiffener laminates having localized ply additions along a portion of the length of the stiffener laminates;

FIG. 23 is an exploded view of an embodiment of the braided radius filler wrapped with an adhesive layer;

FIG. 24 is a schematic diagram of a further embodiment of a manufacturing system for manufacturing a braided radius filler and including a mandrel forming system located downstream of the braiding station and further including a consolidation station and an inspection station;

FIG. 25 is a cross-sectional view of the mandrel forming system taken along line 25 of FIG. 24 and illustrating a movable mandrel die having a mandrel a die cavity occupied by the braided radius filler;

FIG. 26 is a cross-sectional view of the mandrel forming system during injection of ceramic matrix into the mandrel die cavity;

FIG. 27 is a cross-sectional view of the mandrel forming system with the ceramic matrix in a hardened state;

FIG. 28 is a schematic diagram of the manufacturing system of FIG. 24 with the mandrel forming system mounted in a press system;

FIG. 29 is a cross-sectional view of the press system taken along line 29 of FIG. 28 and illustrating the mandrel forming system captured between a movable upper press and a press base of the press system;

FIG. 30 is a cross-sectional view of the press system showing separation of the mandrel die from the mandrel forming base following the consolidation of the braided radius filler FIG. 31 is a cross-sectional view of the mandrel forming system following the dissolving and removal of the hardened ceramic matrix from the mandrel die cavity;

FIG. 32 is a schematic diagram of a further embodiment of the manufacturing system of FIG. 28 and illustrating the mandrel forming system located offline from the braiding station;

FIG. 33 is a cross-sectional view of the mandrel forming system showing a dummy radius filler temporarily installed in the mandrel die cavity;

FIG. 34 is a cross-sectional view of the mandrel forming system showing the injection of adhesive into the mandrel die cavity and around the dummy radius filler;

FIG. 35 is a cross-sectional view of the mandrel forming system with the ceramic matrix in a hardened state;

FIG. 36 is an exploded cross-sectional view of the mandrel forming system after removal of the dummy radius filler from the mandrel die cavity and illustrating the resulting contour formed into the hardened ceramic matrix;

FIG. 38 is a schematic side view of a pair of back-to-back stiffener laminates defining a radius filler region;

FIG. 39 is a schematic side view of the stiffener laminates and showing an adhesive layer applied to the opposing pair of stiffener outer radii;

FIG. 40 is a schematic side view of the overwrapping of the adhesive layer onto the radius filler base surface;

FIG. 41 is a schematic side view of the base laminate being assembled onto the stiffener laminates;

FIG. 42 is a schematic side view of a composite structure produced by curing the laminate assembly containing the adhesively-wrapped braided radius filler;

FIG. 44 is a perspective view of an embodiment of a radius filler core;

FIG. 45 is a perspective view of an embodiment of a braided sleeve;

FIG. 46 is a perspective view of a braided sleeve applied over a radius filler core to form a sleeved radius filler;

FIG. 47 is a cross-sectional view of a sleeved radius filler installed within a radius filler region of a laminate assembly;

FIG. 49 is an exploded side view of a plurality of legs prior to joining to the radius filler corners of the main sleeve portion;

FIG. 50 is a schematic side view of an assembled legged sleeved radius filler showing the modal joints or stitching connecting the legs to the main sleeve portion;

FIG. 51 is a schematic side view of a legged sleeve following the braiding thereof over a cylindrically-shaped dummy radius filler;

FIG. 52 is a schematic side view of a legged sleeve braided over a triangularly-shaped dummy radius filler;

FIG. 53 is a schematic side view of an assembled legged sleeve covering a radius filler inner core;

FIG. 54 is an exploded view of a legged sleeved radius filler prior to assembly with a pair of back-to-back stiffener laminates and a base laminate;

FIG. 55 is a side view of the stiffener laminates, the base laminate, and the radius filler after assembly; and FIG. 56 is a side view of an I-beam composite structure having an upper radius filler and a lower radius filler with a vertical leg interconnecting the upper and lower radius filler.

DETAILED DESCRIPTION

Figure 6:
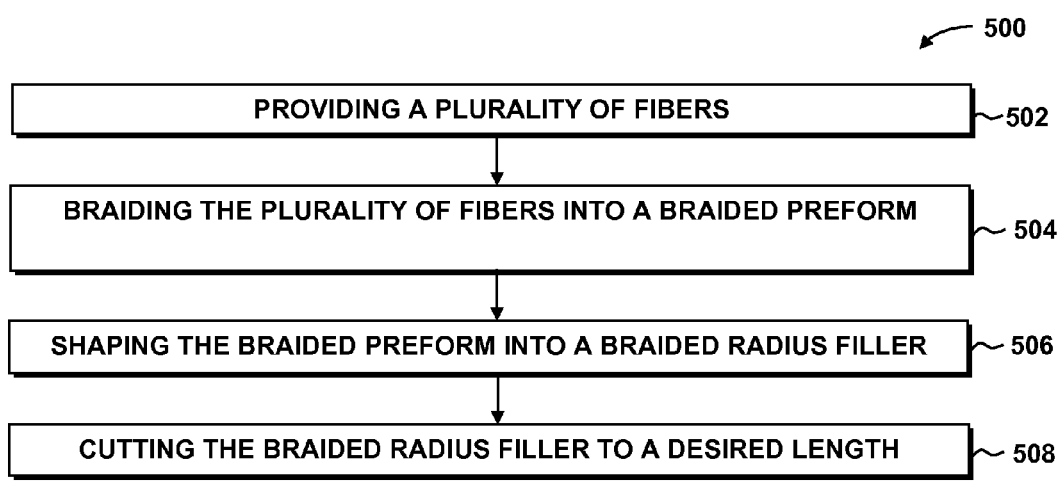
FIG. 6 is a flowchart illustrating one or more operations that may be included in a method of manufacturing a braided radius filler.

Referring now to the drawings wherein the showings are for purposes of illustrating various embodiments of the disclosure, shown in FIG. 1 is a perspective view of an aircraft 100 having a fuselage 102 extending from a forward end of the aircraft 100 to an aft end of the aircraft 100. The aft end may include an empennage 110 having one or more tail surfaces for directional control of the aircraft 100 such as a vertical stabilizer 112 and a pair of horizontal stabilizers 114. The aircraft 100 may further include a pair of wings 108 extending outwardly from the fuselage 102 and one or more propulsion units 104. The fuselage 102, the wings 108, the vertical stabilizer 112, the horizontal stabilizers 114, and/or other aircraft components may be formed as composite structures 106.

Referring to FIG. 2 shown is a partial cutaway view of a portion of a horizontal stabilizer 114 of the aircraft 100 of FIG. 1. The horizontal stabilizer 114 may extend along an outboard direction from a stabilizer root to a stabilizer tip. As indicated above, the horizontal stabilizer 114 may be formed of composite skin panels 150 that may be co-cured or co-bonded to one or more composite stiffeners 152 or spars. In FIG. 2, the composite stiffener 152 is shown as an I-beam 160 although the composite stiffener 152 may be provided in a variety of other cross-sectional shapes.

Referring to FIG. 3, shown is a partially exploded view of the composite stiffener 152 of FIG. 2. The composite stiffener 152 may be comprised of a pair of C-channels 164 in back-to-back relationship to form an I-beam 160. Each C-channel 164 includes a web 166 having flanges 168 at the upper and lower ends of the C-channel 164. Each flange 168 transitions from the web 166 at a radiused web-flange transition and results in a lengthwise radius filler region 158 extending along the upper portion and the lower portion of the I-beam 160. Each radius filler region 158 on the upper and lower portion may be filled with a noodle or radius filler in one of many embodiments disclosed herein.

In FIG. 4, shown is a schematic diagram of a portion of a composite structure 106 and illustrating a pulloff load 178 acting on an interface between the stiffener laminates 162 and a base laminate 172. The pulloff load 178 is an out-of-plane load that may be transmitted through the web 166 of the C-channels 164 creating a reaction force 180 on opposite sides of the braided radius filler 230. The pulloff load 178 and the reaction forces 180 may be oriented normal to the plane of the base laminate 172 and may tend to separate or de-bond the flanges 168 from the base laminate 172 and/or delaminate the composite plies that make up the stiffener flanges 168 and the base laminate 172. The pulloff load 178 may be of greatest magnitude at the location of the tangent points 156 of the flanges 168 with the corresponding stiffener outer radius 154.

In FIG. 5, shown is an embodiment of a braided radius filler 230 in its final shape. The braided radius filler 230 may be formed of continuous fibers 308 that are braided in multiple directions instead of a single axial direction typical of conventional radius fillers. The multiple fiber directions of the braided radius filler 230 may advantageously prevent or reduce or minimize the propagation of a crack into the composite laminates that surround the radius filler region 158. As indicated above, cracking in a radius filler may occur during manufacturing of the radius filler as a result of mismatches in tooling or due to residual strain resulting from processing (e.g., curing) operations. In this regard, residual strain may occur in a radius filler due to a mismatch in the coefficient of thermal expansion of the radius filler relative to coefficient of thermal expansion of the composite laminates surrounding the radius filler. Advantageously, the braided radius filler 230 as disclosed herein may provide improved resistance to crack initiation and/or improved resistance to crack growth. By reducing crack initiation or crack growth, the composite stiffener 152 may exhibit improved pulloff load capability relative to conventional composite stiffeners.

In FIG. 5, the braided radius filler 230 may be formed of a plurality of composite reinforcing fibers 308. The fibers 308 may be dry fibers 324 that may be braided via a braiding machine 304 and then later wetted in a resin bath 330. Alternatively, the fibers 308 may be provided as prepreg fibers that may be pre-impregnated or pre-coated with resin such as thermoplastic resin or thermosetting resin. Types of thermoplastic resin may include polypropylene, polyethylene terephthalate, polyetherketoneketone (i.e., PEKK), polyetheretherketone (i.e., PEEK), polyphenylene sulfide, polyetherimide (i.e., PEI), polyamide, and other types of thermoplastic resin. Types of thermosetting resin may include epoxy or other thermosetting resin compositions. As indicated above, the fibers 308 may be generally continuous along the length of the braided radius filler 230. In one embodiment, the fibers 308 may be formed as continuous composite tape 310 such as unidirectional slit tape. The fibers 308 may comprise carbon fibers, aramid fibers, Kevlar® fibers, glass fibers, or any other type of reinforcing fiber material or combination of materials.

The braided radius filler 230 may be formed into a generally triangular shape with opposing concave radius filler side surfaces 232 and may have a generally planar radius filler base surface 234. The radius filler side surfaces 232 may be sized and shaped complementary to the opposing stiffener outer radii 154 of the composite stiffener 152. In this regard, any one the radius filler embodiments disclosed herein may be applied to stiffener shapes other than the I-beam 160 configuration. For example, any one of the radius filler embodiments disclosed herein may be installed in the radius filler region 158 of a hat-section stiffener, an L-shaped stiffener, a Z-shaped stiffener, and any one of a variety of other stiffener configurations. Furthermore, the radius filler embodiments disclosed herein may be used in fabricating composite structures for any application, without limitation, and are not limited for use in composite aircraft structures such as the horizontal stabilizer 114 illustrated in FIG. 2.

Referring to FIG. 6, shown is a flowchart illustrating one or more operations that may be included in a method 500 of manufacturing a braided radius filler 230. Any one of the steps, in whole or in part, of the method 500 may be performed using a manufacturing system 300 illustrated in FIG. 7. Step 502 of the method 500 may include providing a plurality of fibers 308 at a braiding station 302 of the manufacturing system 300. The fibers 308 may be provided on braiding spools 306 mounted on a creel of a braiding machine 304. The fibers 308 may be provided in any one of a variety of different forms. For example, in an embodiment, the fibers 308 may be provided as prepreg unidirectional slit tape which may be pre-impregnated with thermoplastic resin as indicated above. However, in other embodiments, the fibers 308 may be provided as dry fibers 324 that may be wetted in a resin bath 330 prior to braiding into a braided preform 200 or after braiding into a braided preform 200. As described in greater detail below, for dry fibers 324, the method may include heating the resin coating the dry fibers 324, and at least partially curing the resin after shaping, compacting, and/or consolidating the braided preform 200 into the braided radius filler 230 prior to installing the braided radius filler 230 in a radius filler region 158 of a composite stiffener 152.

Figure 7:
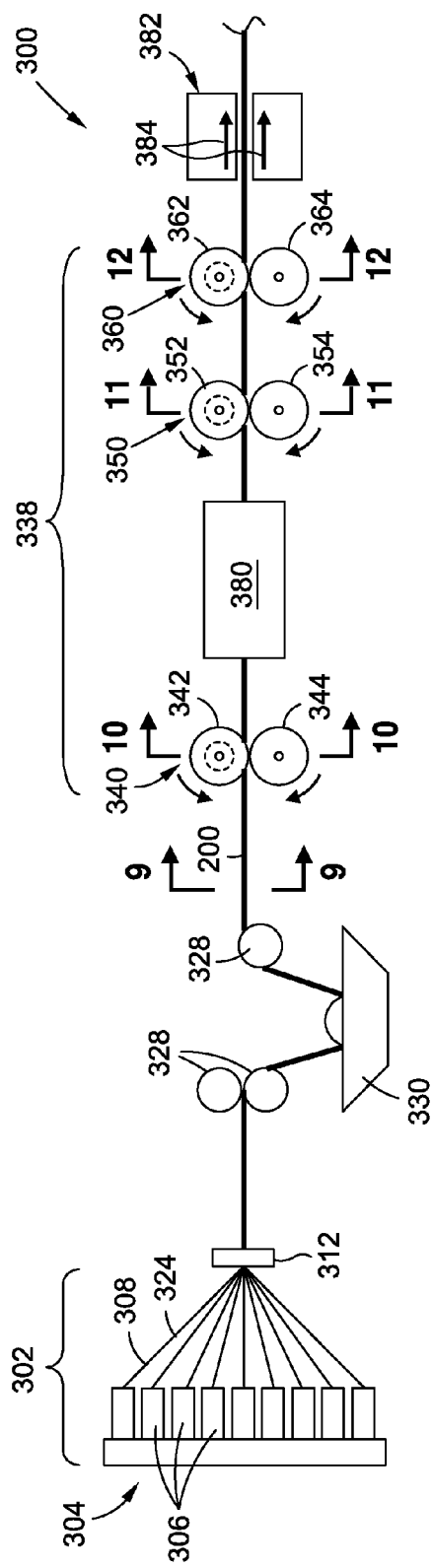
FIG. 7 is a schematic diagram of an embodiment of a manufacturing system for manufacturing a braided radius filler.

FIG. 7 illustrates an embodiment of the manufacturing system 300 for fabricating a braided radius filler 230. The manufacturing system 300 may include any number of braiding machines 304. Each braiding machine 304 may include a plurality of braiding spools 306 containing dry fibers 324. The manufacturing system 300 may include a pulling mechanism 382 for continuously drawing the fibers 308 from the braiding spools 306 and assembling the braided fibers 308 via a braiding guide 312 to form a braided preform 200 in a biaxial braiding configuration. The pulling mechanism 382 may continuously pull the braided preform 200 through the different stages of the manufacturing system 300. Although not shown, the braiding machine 304 may be configured to provide fibers 308 assembled as uni-axial fibers. The uni-axial fibers may be braided with cross-braided fibers to form a tri-axial braiding configuration of the braided preform 200.

In some embodiments, the dry fibers 324 may be passed through a set of feed rollers 328 and into a resin bath 330 located downstream of the braiding station 302 for coating the dry fibers 324 with resin. In other embodiments, the fibers 308 may be braided over an inner core 242 (see FIG. 19) as described below. In further embodiments, the resin bath 330 may be omitted and the fibers 308 may be provided as prepreg fibers 308 such as composite tape 310 pre-impregnated with resin. For example, the composite tape may be provided as prepreg unidirectional tape such as slit tape. The composite tape may be provided in any width such as one-eighth inch, one-quarter inch, or in any other width. The fibers in the composite tape may be formed of any material including graphite or carbon, glass, ceramic, aramid, and any other type of reinforcing fiber material as mentioned above. In any one of the examples disclosed herein, the fibers 308 may include a blend of reinforcing fibers and thermoplastic fibers. The reinforcing fibers may include high-strength fibers such as the above-mentioned carbon fibers, graphite fibers, aramid fibers, Kevlar® fibers, glass fibers, and other reinforcing and/or high-strength fiber material.

In some embodiments, the reinforcing fibers may be combined or blended with thermoplastic fibers such as by braiding the reinforcing fibers with the thermoplastic fibers as described herein. In some examples, the reinforcing fibers may be combined with the thermoplastic fibers to form a core around which reinforcing fibers and/or thermoplastic fibers may be braided. The thermoplastic fibers may be subjected to heating during the process of forming the radius filler. The heating of the thermoplastic fibers may at least partially melt the thermoplastic fibers and reduce the viscosity thereof allowing the melted thermoplastic material to infuse into the reinforcing fibers during the process of forming the radius filler. In a further embodiment, the fibers 308 may be substantially all thermoplastic fibers that may be braided together as disclosed herein. Heat may be applied to the substantially all thermoplastic fibers allowing for melting and fusing together of the thermoplastic fibers during the process of shaping and curing (e.g., solidifying) the braided radius filler 230.

Figure 8:
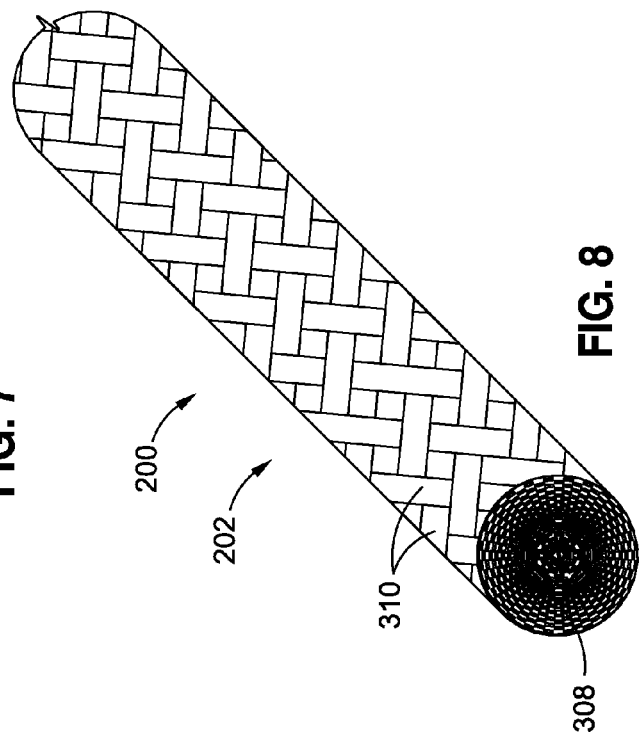
FIG. 8 is a perspective view of a braided preform having a cylindrical configuration.
Figure 9:
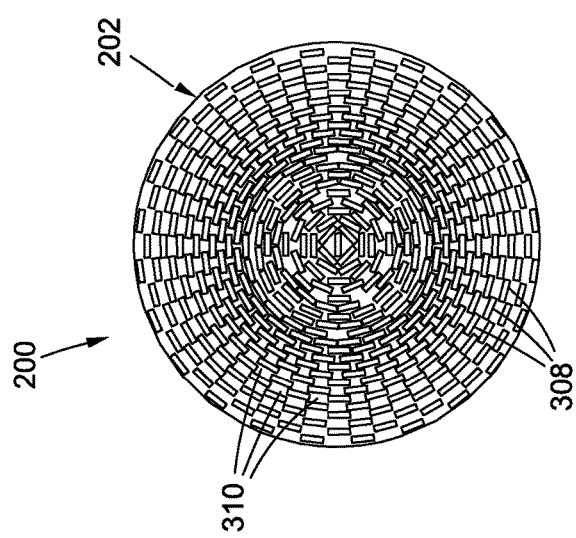
FIG. 9 is a cross-sectional view of the braided preform taken along line 9 of FIG. 7.

Step 504 of the method 500 of FIG. 6 may include braiding the plurality of fibers 308 into a braided preform 200 using one or more braiding machines 304. Although the manufacturing system 300 in FIG. 7 includes a single braiding machine 304, any number of braiding machines 304 may be provided. In some embodiments, the braiding machine 304 may braid the fibers 308 into a braided cylinder 202 as shown in FIGS. 8-9. In other embodiments, the braiding machine 304 may be configured to braid the fibers 308 into a braided preform 200 having a triangular cross-sectional shape (not shown) with generally straight sides. In still other embodiments, the fibers 308 may be braided over an inner core 242 as shown in FIG. 16-19 and described in greater detail below. The inner core 242 may have a cross-sectional size that is smaller that the braided radius filler 230. The inner core 242 may be formed of the same material or a different material than the fibers 308 of the braided radius filler 230. In some embodiments, the material of the inner core 242 may have a specific functionality. For example, the inner core 242 may be formed of material providing a relatively high electrical conductivity. In other embodiments, the inner core 242 may be formed of material providing acoustic damping capability, impact resistance, or the inner core 242 may be formed of material that may function as a conduit for communication signals or data signals.

Step 506 of the method 500 of FIG. 6 may include shaping and/or compacting the braided preform 200 into a braided radius filler 230 by passing the braided preform 200 through a compaction station 338. In the compaction station 338, the braided preform 200 may be shaped into a generally triangular cross-sectional shape having concave radius filler side surfaces 232 and a generally planar radius filler base surface 234 as shown in FIG. 12. In this regard, the compaction station 338 may include one or more forming dies for shaping the braided preform 200. For example, FIG. 7 illustrates the compaction station 338 including a series of roller sets for progressively shaping the braided cylinder 202 into a triangular shape with concave radius filler side surfaces 232.

Figure 10:
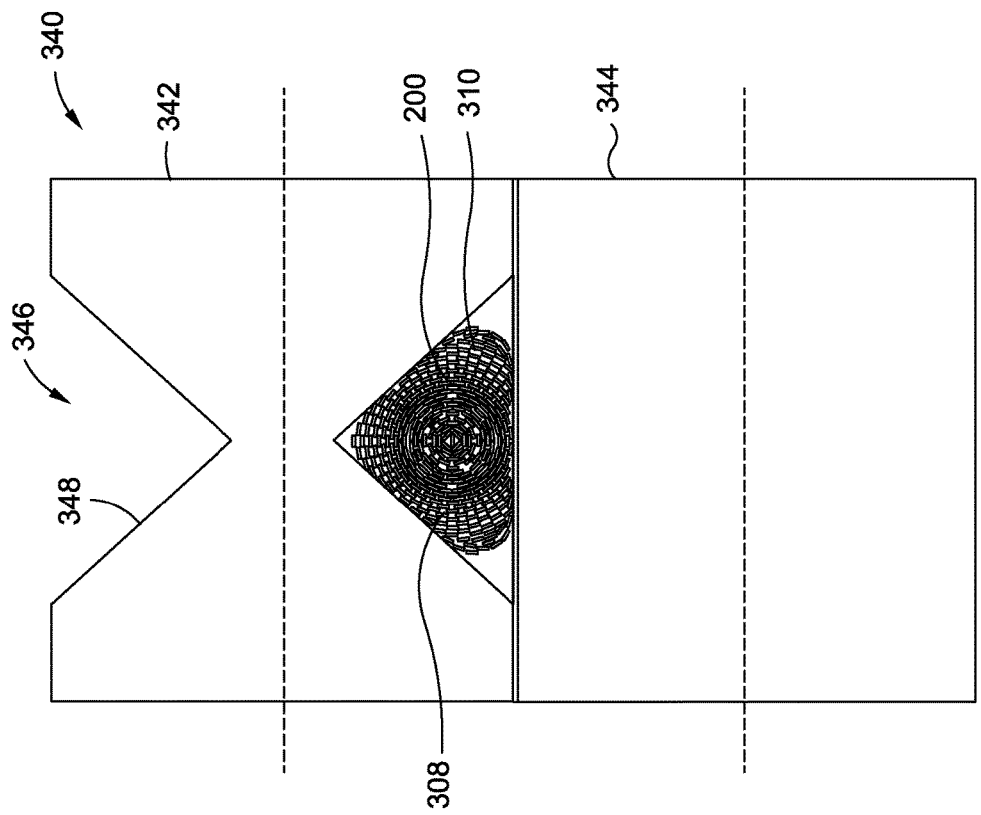
FIG. 10 is a cross-sectional view of a first roller die set taken along line 10 of FIG. 7.

FIG. 10 illustrates the initial shaping of the braided cylinder 202 into a rounded triangular cross-sectional shape by passing the braided cylinder 202 through a first roller die set 340. The first roller die set 340 may include a first upper die 342 and a first lower die 344, each of which may be rotatable about a respective rotational axis. The first upper die 342 may have a first die cavity 346 having a first cross-sectional shape 348 with a triangular configuration. In some embodiments, the first roller die set 340 may be heated to allow for heating and softening of the resin coating the fibers 308 of the braided preform 200 to facilitate the shaping of the braided preform 200. In other embodiments, the manufacturing system 300 may include one or more ovens 380 or other heating mechanisms for further heating and softening the resin to facilitate the shaping of the braided preform 200. Although the oven 380 is shown positioned between the first roller die set 340 and the second roller die set 350, the oven 380 or other heating mechanism may be located at any position along the manufacturing system 300. In some embodiments described below, resistive wiring may be braided into the braided preform 200 to allow for internally heating and softening the resin and the braided preform 200, as described below.

In FIG. 7, the braided preform 200 may be passed through a second roller die set 350 having a second upper die 352 and a second lower die 354. FIG. 11 illustrates a cross-section of the second upper die 352 having a second die cavity 356 with a second cross-sectional shape 358 to shape the braided preform 200 closer toward the final shape of the braided radius filler 230. The second roller die set 350 may optionally be heated to facilitate softening of the resin and shaping of the braided preform 200. FIG. 12 illustrates the third roller die set 360 which may also be heated and which may include a third upper die 362 and a third lower die 364. The third upper die 362 may include a third cross-sectional shape 368 to form the concave radius filler side surfaces 232 and the generally planar radius filler base surface 234 of the braided radius filler 230. Although the manufacturing system 300 of FIG. 7 illustrates a series of roller dies for shaping the braided preform 200 in a continuously moving process, the manufacturing system 300 may include one or more forming dies of any size, shape, and configuration, without limitation. For example, the manufacturing system 300 may include one or more upper and lower clamping dies (not shown), or one or more stationary dies (not shown) having internal die cavities for progressively shaping the fibers 308 into the final shape of the braided radius filler 230. In some embodiments, one or more of the forming dies may include provisions for forming adhesive tips 244 on the radius filler corners 236 to fill in the extreme corners of the cross-sectional shape of the radius filler region 158 of a composite stiffener 152. For example, FIG. 17 illustrates adhesive tips 244 that may be formed on a braided radius filler 230 by injecting adhesive into the corners of the die cavity.

Step 508 of the method 500 of FIG. 6 may include cutting the braided radius filler 230 to a desired length. In an embodiment, a cutting station (not shown) may be included downstream of the pulling mechanism 382. As indicated above, the pulling mechanism 382 may be configured to draw the fibers 308 from the braiding station 302 and through the compaction station 338 on a continuous basis. However, it is contemplated that for a manufacturing system 300 having vertically movable clamping dies (not shown) for compacting and/or shaping the braided radius filler 230, the pulling mechanism 382 may be configured to operate on a pulse feed basis (e.g. start-and-stop basis) for pulling the fibers 308 through the various stages of the manufacturing system 300. The cutting station may be configured to cut the braided radius filler 230 to a length substantially equivalent to the length of the radius filler region 158 into which the radius filler may be assembled. In some cases, the braided radius filler 230 may be cut into relatively long lengths such as up to 50 feet or more in length for a single braided radius filler 230.

Figure 13:
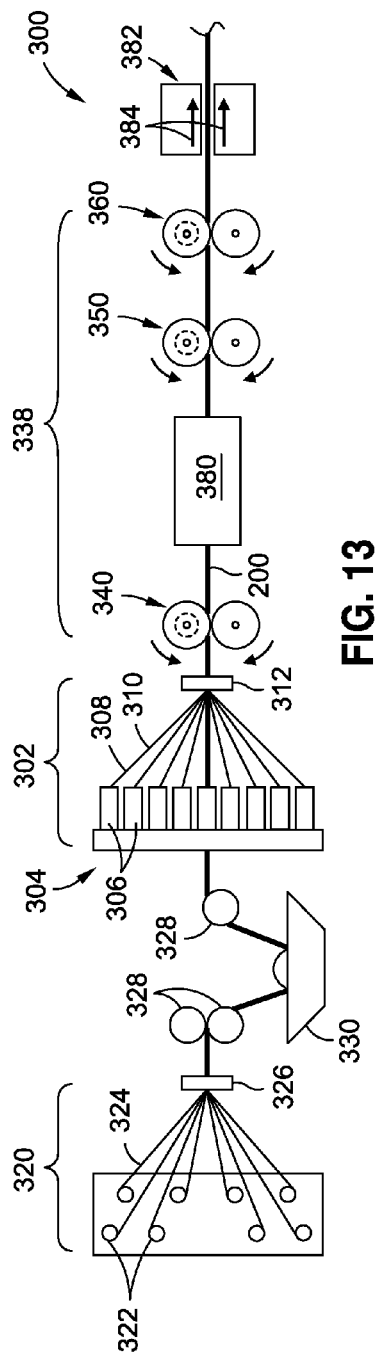
FIG. 13 is a schematic diagram of a further embodiment of a manufacturing system for manufacturing a braided radius filler having a core fabricating station for fabricating an inner core over which the braided radius filler may be braided.

Referring to FIG. 13, shown is a further embodiment of a manufacturing system 300 having a core fabricating station 320 for fabricating an inner core 242 (FIG. 16) over which the braided radius filler 230 may be braided. The inner core 242 may be formed of fibers 308 drawn from one or more core spools 322 using a pulling mechanism 382. The fibers 308 of the inner core 242 may be assembled at a core guide 326. In some embodiments, the inner core 242 may be formed into a generally cylindrical shape although other shapes are contemplated for the inner core 242. In some examples, the fibers 308 of the inner core 242 may be formed of the same material or a different material than the fibers 308 that are braided over the inner core 242. In the embodiment shown, the fibers 308 may be provided as dry fibers 324 which may be passed through a set of feed rollers 328 and into a resin bath 330 for coating the dry fibers 324 with resin. However, the resin bath 330 may be omitted and the fibers 308 for the inner core 242 may be provided as prepreg fibers 308 such as prepreg composite tape 310. Fibers 308 may be braided over the inner core 242 to form a braided preform 200 such as a braided cylinder 202 (e.g., FIG. 8). However, the inner core 242 may be provided in a non-cylindrical shape such as a generally triangular cross-sectional shape or other shape resulting in a correspondingly shaped braided preform (not shown).

In FIG. 13, the prepreg composite tape 310 of the braided preform 200 may be heated such as by using one or more heated roller dies or an optional oven 380 to soften the resin and allow for intermingling of the resin in the strands of composite tape that make up the braided preform 200. The braided radius filler 230 may be allowed to cool and solidify after exiting the last roller die set of the compaction station 338. For thermosetting prepreg tape, heat may provided for curing the resin after the braided preform 200 has been formed into the desired shape by the forming dies. In an optional embodiment, the fibers 308 of the braiding machine 304 may be provided as dry fibers 324 that may be passed through a resin bath 330 for wetting the fibers similar to the wetting of the fibers at the core fabricating station 320.

Figure 14:
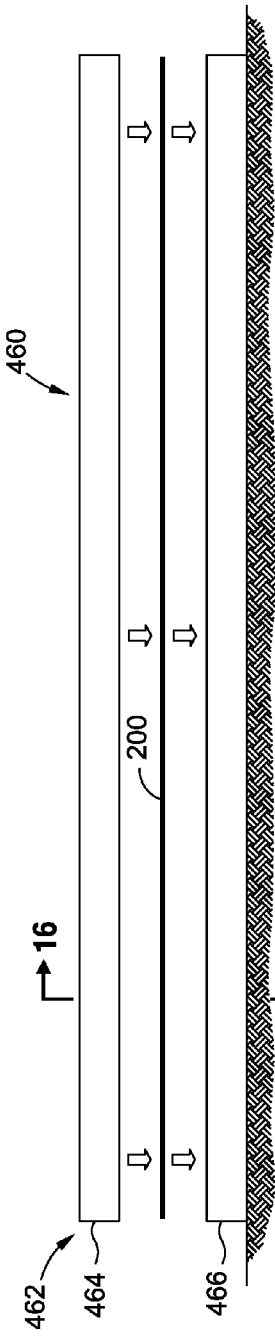
FIG. 14 is an schematic side view of a final forming station having an upper forming die separated from a lower forming die.

FIG. 14 is an exploded side view of a final forming station 460 for consolidating and/or curing the braided radius filler 230 after the braided preform 200 is cut to a desired length upon exiting the compacting station 338 shown in FIG. 13. The final forming station 460 may include a forming die set 462 having an upper forming die 464 and a lower forming die 466. The forming die set 462 may be formed in a length that is complementary to the length of the braided preform 200. The upper forming die 464 may be vertically movable to allow for installing the braided radius filler 230 in the lower forming die 466. The method of manufacturing the radius filler may include mounting the braided radius filler 230 in the final forming die set 462 as shown in FIG. 16. The braided radius filler 230 may optionally include an inner core 242. However, the braided radius filler 230 may be formed without any inner core 242.

Figure 15:
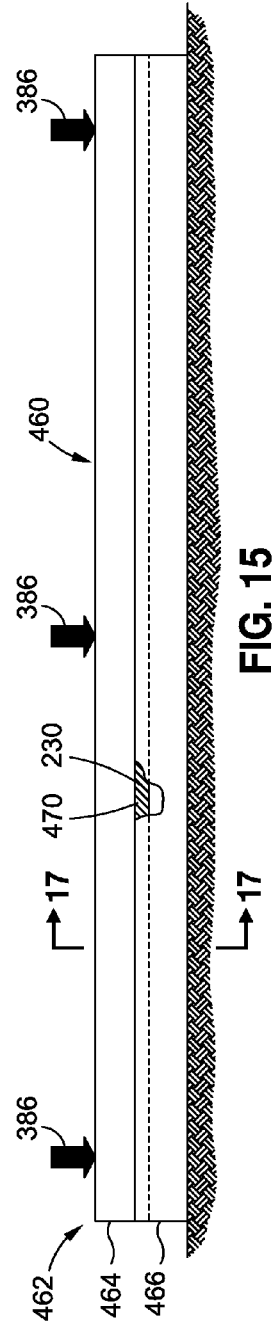
FIG. 15 is a schematic side view of the final forming station of FIG. 14 with the braided preform clamped between the upper forming die and the lower forming die for consolidating and/or curing the braided radius filler.

In FIG. 16, the lower forming die 466 may include a cavity having a contour that approximates the contour (e.g., see FIG. 22) of the radius filler region 158 of the laminate assembly 176 into which the final radius filler may be installed (FIG. 22) as described below. As shown in FIGS. 15 and 17, the upper forming die 464 may be mated to the lower forming die 466 with the braided radius filler 230 captured there-between. In some embodiments, the braided radius filler 230 may be provided in a size that results in an intentional overfill of the braided radius filler 230 within the forming die cavity such that after consolidation, the braided radius filler 230 has a final volume that substantially matches the volume of the radius filler region 158. The method of manufacturing the radius filler may include applying heat and/or pressure 386 (FIG. 15) to the braided radius filler 230 in the final forming die set 462, and contouring the opposing radius filler side surfaces 232 into a final shape that is complementary to a contour (e.g., FIG. 22) of the radius filler region 158 of the laminate assembly 176 into which the radius filler may be installed.

In FIGS. 16-17, the forming die set 462 may optionally include one or more adhesive fill ports 468 for injecting adhesive into the cavity containing the braided radius filler 230 to form adhesive tips 244 at the radius filler corners 236. The adhesive tips 244 may advantageously fill the void that may otherwise occur due to the inability of the braided fibers 308 to fit within the relatively narrow thickness at the extreme ends or tips of the radius filler corners 236. In this regard, the method of manufacturing the braided radius filler 230 may include mounting the braided radius filler 230 in the final forming die set 462 as shown in FIG. 16, and injecting adhesive into the final forming die set 462 as shown in FIG. 17 to form an adhesive tip 244 on each radius filler corner 236 as shown in FIG. 18. The adhesive tips 244 may be allowed to cool and solidify with the resin in the composite plies after which the braided radius filler 230 may be removed from the final forming die set 462.

Referring to FIGS. 19-20, shown is an embodiment of the braided preform 200 having localized changes 204 in the cross-sectional area or size of the braided preform 200. The localized changes 204 in the cross-sectional area or size of the braided preform 200 may facilitate the forming of localized changes 238 in the cross-sectional area or size of the braided radius filler 230 as shown in FIG. 21. In this regard, the localized changes 238 may be formed in the braided radius filler 230 to accommodate a non-uniform contour in the radius filler region 158 of the composite structure 106. For example, one or both of the stiffener laminates 162 may include ply additions 184 or ply drops 182 along the length of the stiffener laminates 162. Ply additions 184 may be included in the stiffener laminates 162 to provide localized increase in the strength of the stiffener such as to accommodate increased loads at that location or to accommodate mounting brackets or other hardware mounted to the stiffener at that location.

Referring briefly to FIG. 13, localized changes 238 in the cross-sectional area of the braided radius filler 230 may be formed by adjusting the tension force or pulling force 384 on the braided preform 200 as the fibers 308 are drawn from the braiding spools 306 and braided into the braiding guide 312. In this regard, the method of manufacturing the braided radius filler 230 may include varying the pulling force 384 on the braided preform 200 for different time intervals when braiding the braided preform 200. In response to varying the pulling force 384, the bias angle of the fibers 308 may be varied. For example, by increasing the pulling force 384 on the fibers 308 drawn through the braiding guide 312, the bias angle of the fibers 308 relative to the longitudinal axis 206 may increase from a relatively large first bias angle 208 of the braided preform 200 to a smaller second bias angle 210 as shown in FIG. 20. A larger bias angle may result in a larger cross-sectional size of the braided radius filler 230. A smaller bias angle may result in a smaller cross-sectional size of the braided radius filler 230. The bias angle of the fibers 308 relative to the longitudinal axis 206 may be varied in any range (e.g., from 10 degrees to 80 degrees). The process of varying the bias angle of the fibers 308 may result in varying the cross-sectional size of the braided preform 200 as shown in FIGS. 19-20. In this regard, increasing the pulling force 384 on the braided preform 200 may decrease the cross-sectional area of the braided preform 200. Conversely, decreasing the pulling force 384 on the braided preform 200 may increase the cross-sectional area of the braided preform 200.

The length of the localized change 204 in cross-sectional size and the location along the length of the braided preform 200 may be controlled by controlling the pulling mechanism 382 to adjust the pulling force 384 on the braided preform 200 as the braided preform 200 is pulled through the braiding guide 312. The localized changes 204 in the cross-sectional size of the braided preform 200 may be formed complementary to the localized changes in the contour along the length of the radius filler region 158 (e.g., see FIG. 22). In this regard, the cavity in the lower forming die 466 (e.g., see FIG. 16) may be contoured along the length in a manner substantially duplicating the contour along the length of the radius filler region 158 of the laminate assembly 176 (FIG. 22). In some embodiments, the bias angle may be varied in order to achieve a desired stiffness or load-carrying capability of the braided radius filler 230.

In FIG. 23, shown is an exploded illustration of an adhesive-wrapped braided radius filler 230 prior to assembly of the braided radius filler 230 with the stiffener laminates 162 and the base laminate 172. In some examples, an adhesive layer 240 may be applied to the radius filler side surfaces 232 and the radius filler base surface 234 prior to installing the adhesive-wrapped braided radius filler 230 in the radius filler region 158. In other examples, the adhesive layer 240 may be applied to the surfaces of the opposing stiffener outer radii 154 prior to installing the braided radius filler 230 in the radius filler region 158, as described in greater detail below and illustrated in FIG. 39. The radius filler base surface 234 may be over-wrapped with the adhesive layer 240 as shown in FIG. 40 prior to installing the base laminate 172 over the braided radius filler 230. Advantageously, the adhesive-wrapped braided radius filler 230 may improve the toughness, durability, and crack-resistance at the boundary of the braided radius filler 230 with the stiffener laminates 162 and the base laminate 172. As described in greater detail below, the stiffener laminates 162 may also be provided with a relatively large radius to improve the stress distribution at the boundary between the radius filler side surfaces 232 and the stiffener outer radii 154 and thereby improve the pull-off strength of the stiffener laminates 162 relative to the base laminate 172. The adhesive-wrapped braided radius filler 230 may be manufactured using any one of the manufacturing systems 300 and methods described herein.

FIG. 24 illustrates an embodiment of a manufacturing system 300 using a mandrel forming station 420 located downstream of a braiding station 302 to consolidate and/or cure the braided radius filler 230. The manufacturing system 300 may include a braiding station 302 having one or more braiding machines 304 similar to that which are described above. The pulling mechanism 382 may pull the braided preform 200 through the braiding guides 312. The mandrel forming station 420 may include a mandrel forming system 422 to form the braided preform 200 into the desired final shape of the braided radius filler 230. The manufacturing system 300 may be operated in a pulse flow manner wherein successive lengths of braided preform 200 may be shaped, consolidated, and/or cured using the mandrel forming system 422 in combination with a press system 400.

Referring to FIG. 25, the mandrel forming system 422 may include a mandrel die 424 and a mandrel forming base 426 which may be mated to one another. The mandrel die 424 may include a mandrel die cavity 428 that may be sized and configured to receive the braided preform 200 and provide additional space between the mandrel die cavity 428 and the surfaces of the braided preform 200. In the embodiment shown, the braided preform 200 may be braided into a triangular cross-sectional shape that may approximate the final shape of the braided radius filler 230 although the braided preform 200 may be braided into other cross-sectional shapes. Although not shown, the braided preform 200 may optionally include an inner core 242 as described above. In a further embodiment, the braided preform 200 may include one or more internal heater wires 246 such as electrical resistance wires. The heater wires 246 may be spooled onto one or more of the braiding spools 306 of one or more braiding machines 304 causing the heater wires 246 to be internally braided into the braided preform 200.

Although FIG. 25 illustrates three (3) heater wires 246 internally braided into the braided preform 200, any number of heater wires 246 may be included. The heater wires 246 may be arranged in any manner within the braided preform 200, and are not limited to the triangularly-shaped arrangement of the heater wires 246 shown in the figures. For example, the heater wires 246 may be braided such that some heater wires 246 are positioned adjacent to one or more surface of the braided preform 200, or the heater wires 246 may be positioned internally and on or near one or more surfaces of the braided preform 200. In an embodiment, the heater wires 246 may be resistively heated by passing electrical current through the heater wires 246. The heater wires 246 may be used to heat 388 and soften the resin coating the prepreg fibers 308 of the braided preform 200 to allow for consolidation, curing, and/or solidification of the braided radius filler 230. The heater wires 246 may soften the resin prior to and/or during the consolidation of the braided radius filler 230 contained within the mandrel forming system 422. The heater wires 246 may also assist in heating the expandable ceramic matrix 432 (e.g., see FIG. 26) causing expansion thereof when the mandrel forming system 422 is clamped within the press system 400, as described in greater detail below.

FIG. 26 illustrates the injection of expandable soluble ceramic matrix 432 into one or more fill ports 430 in the mandrel die 424 of the mandrel forming system 422. The ceramic matrix 432 may be provided as a slurry or in a semi-liquid composition. The injected ceramic matrix 432 may fill the volume of space between the braided radius filler side surfaces 232 and the walls of the mandrel die cavity 428. The ceramic matrix 432 may be continuously introduced into one of the ports 430 until excess ceramic matrix 432 starts flowing out of an another port. FIG. 27 illustrates the ceramic matrix 432 in a hardened state after which the ports 430 may be closed off with plugs 434.

FIG. 28 illustrates the mandrel forming system 422 clamped over the braided radius filler 230 and moved into the press system 400. The mandrel die 424 and the mandrel forming base 426 may be clamped within the press system 400 between the movable upper press 402 and the press base 404 as shown in FIG. 29. The press system 400 may include an actuator 406 such as a mechanical or hydraulic actuator for vertically moving the movable upper press 402 relative to the press base 404 between an open position (FIGS. 24 and 30) and a closed position (FIG. 28-29). The clamping of the mandrel forming system 422 within the press system 400 (FIG. 29) may prevent relative movement of the mandrel die 424 during expansion of the ceramic matrix 432 as a result of heating thereof. Heat may be applied to the mandrel forming system 422 in a conventional manner such as by placing the press system 400 in an autoclave or an oven 380. Alternatively, the mandrel forming system 422 may be integrally heated to facilitate heating of the expandable ceramic matrix 432 and cause expansion thereof and consolidation of the braided preform 200 while the mandrel forming system 422 is clamped between the movable upper press 402 and the press base 404. For example, in an embodiment not shown, the movable upper press 402 and the press base 404 may respectively include an upper susceptor face sheet (not shown) and/or a lower susceptor face sheet (not shown) that may be respectively positionable in contact with the mandrel die 424 and the mandrel forming base 426. The upper and/or lower susceptor face sheets may be inductively heated in response to alternating current that may be passed through one or more induction coils (not shown) extending through the movable upper press 402 and/or the press base 404 similar to the arrangement disclosed in U.S. application Ser. No. 13/305,297 entitled SYSTEM AND METHOD OF ADJUSTING THE EQUILIBRIUM TEMPERATURE OF AN INDUCTIVELY-HEATED SUSCEPTOR filed on Nov. 28, 2011, the entire contents of which is incorporated by reference herein.

As disclosed in Ser. No. 13/305,297, the upper and/or lower susceptor face sheet may be formed of an electrically conductive ferromagnetic alloy having a Curie temperature that is dependent on the composition of the ferromagnetic alloy. In this regard, the ferromagnetic alloy from which the upper and/or lower susceptor face sheets are formed may be selected based on the desired temperature to which the expandable ceramic matrix 432 may be heated. For example, the ferromagnetic alloy composition may be selected having a Curie temperature that results in an equilibrium temperature of the upper and/or lower susceptor face sheet that approximately corresponds to a temperature at which the ceramic matrix 432 expands in a manner causing consolidation of the braided radius filler 230 within the mandrel forming system 422. In a further embodiment, the ferromagnetic alloy composition of the upper and lower susceptor face sheets may be selected based on a processing temperature of the resin (e.g., the glass transition temperature or melt temperature of a thermoplastic resin; the curing temperature of a thermosetting resin, etc.) contained in the braided radius filler 230 captured within the mandrel die cavity 428. Advantageously, by using an inductive-susceptor system with upper and/or lower susceptor face sheets, the time associated with heating the mandrel forming system 422 and the ceramic matrix 432 and/or resin contained in the prepreg fibers 308 may be significantly reduced relative to the significant time required to heat the mandrel forming system 422 using conventional heating techniques such as an autoclave or an oven due to the large thermal mass associated with autoclaves and ovens.

FIGS. 29-31 illustrate a method of manufacturing a braided preform 200 by mounting the braided preform 200 in the mandrel forming system 422, and injecting ceramic matrix 432 into the mandrel die cavity 428 containing the braided preform 200. The method may include heating the resin of the fibers 308 to a temperature causing softening of the resin. In addition, the method may include heating 388 (FIG. 29) the ceramic matrix 432 in a manner causing expansion thereof while the mandrel forming system 422 is clamped within the press system 400. The method may further include consolidating the braided radius filler 230 in response to expansion of the ceramic matrix 432, and allowing the resin to cool and solidify after which the braided radius filler 230 may be inspected in an inspection station 450 located downstream of the press system 400. The inspection may be configured to inspect the consolidated or compacted radius filler for defects such as voids, porosity, or other defects. In some embodiments, the inspection station may include nondestructive inspection equipment such as through-transmission ultrasonic inspection equipment.

In FIG. 31, the mandrel forming system 422 may be re-used after consolidating the braided radius filler 230 by separating the mandrel die 424 from the mandrel forming base 426, removing the braided radius filler 230, and applying a solvent to the hardened matrix 436 in order to remove the hardened matrix 436. For example water may be sprayed onto the hardened matrix 436 to solubilize the hardened matrix 436 and allow for removal of the hardened matrix 436 from the mandrel die cavity 428 so that the mandrel forming system 422 may be used on another length of the braided radius filler 230.

In an embodiment (e.g. see FIG. 32), the mandrel forming station 420 may be located offline and/or physically separate from the braiding station 302 and inspection station 450. In this regard, the mandrel forming station 420 may be positioned at a location separate from the braiding station 302 and may utilize a dummy radius filler 438 to form the ceramic matrix 432 into a soluble mandrel which may then be positioned over a length of the braided radius filler 230 and clamped within the press system 400. FIG. 33 illustrates a cross-section of the mandrel forming system 422 which may be mounted on a movable table or other support. The dummy radius filler 438 may have a shape or contour that may match the shape or contour of the radius filler region 158 into which the radius filler may be installed as shown in FIG. 22 and described above.

FIG. 34 illustrates the injection of ceramic matrix 432 into the ports 430 to fill the space between the side surfaces of the dummy radius filler 438 and the surfaces of the mandrel die cavity 428. FIG. 35 illustrates the ceramic matrix 432 hardening such as at room temperature. After the ceramic matrix 432 hardens, the ports 430 may be closed off with plugs 434 similar to that described above and the dummy radius filler 438 may be removed from the mandrel forming system 422. The mandrel forming system 422 may then be mounted in the press system 400. FIG. 36 illustrates the mandrel die 424 separated from the mandrel forming base 426 to allow for clamping the mandrel forming system 422 over a length of the braided radius filler 230 as shown in FIG. 29. The process of heating 388 the hardened ceramic matrix 432 to cause expansion thereof and consolidation of the braided radius filler 230 (FIG. 29) may be performed as described above. Following consolidation of the braided radius filler 230, the mandrel die 424 may be separated from the mandrel forming base 426 and the hardened matrix 436 may be solublized using a solvent (e.g., water) and removed from the mandrel die 424 as shown in FIG. 31 to allow for re-use of the mandrel forming system 422 on another length of the braided preform 200.

Figure 37:
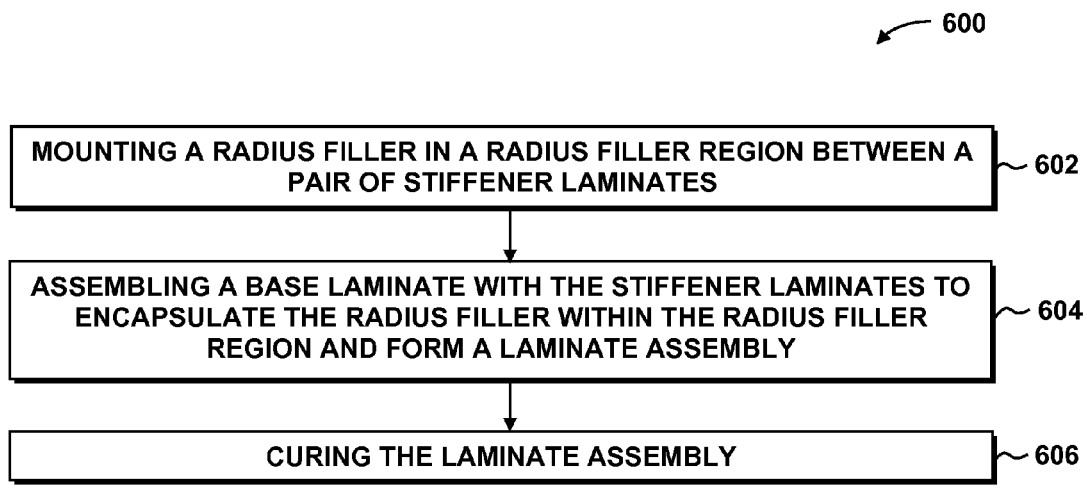
FIG. 37 is a flowchart illustrating one or more operations that may be included in a method of assembling a radius filler with composite laminates to form a composite structure.

FIG. 37 is a flowchart illustrating one or more operations that may be included in a method 600 of installing a braided radius filler 230 in a radius filler region 158 of a composite structure 106. The method 600 is schematically illustrated in FIGS. 38-42. The method 600 may include applying an adhesive layer 240 such as an adhesive sheet onto the surfaces of the opposing stiffener outer radii 154. The stiffener outer radii 154 are part of a pair of back-to-back stiffener laminates 162. The stiffener laminates 162 may be provided as back-to-back C-channels 164, L-sections, or other shapes that result in a radius filler region 158. As shown in FIG. 39, the adhesive layer 240 may extend from the tangent point 156 of a horizontal portion of the flange 168 and may be applied inside the radius filler region 158 to the common tangent point 156 between the webs 166. The adhesive layer 240 may then be applied over the opposing stiffener outer radius 154 with an excess portion of the adhesive layer 240 extending beyond the tangent point 156. Step 602 of the method 600 may include mounting the braided radius filler 230 onto the adhesive layer 240 as shown in FIG. 40 such that radius filler side surfaces 232 are in contact with the adhesive layer 240. FIG. 40 additionally illustrates the over-wrapping of the radius filler base surface 234 with the adhesive layer 240.

Step 604 of the method 600 of FIG. 37 may include assembling the base laminate 172 with the stiffener laminates 162 to encapsulate the braided radius filler 230 within the radius filler region 158 and form a laminate assembly 176 as shown in FIG. 41. The base laminate 172 may be mounted on the flanges 168 of the stiffener laminates 162 such that the base laminate faying surface 174 is in contact with the flange faying surfaces 170. Ideally, the adhesive layer 240 and the braided radius filler 230 are sized and shaped to completely fill the radius filler region 158 defined by the stiffener outer radii 154 and the lower surface of the base laminate 172. Step 606 of the method 600 may include curing the laminate assembly 176 (FIG. 42) by applying heat and/or pressure to form a composite structure 106. For example, the laminate assembly 176 may be vacuum-bagged and positioned within an autoclave to co-cure and/or co-bond the stiffener laminates 162 with the base laminate 172.

Figure 43:
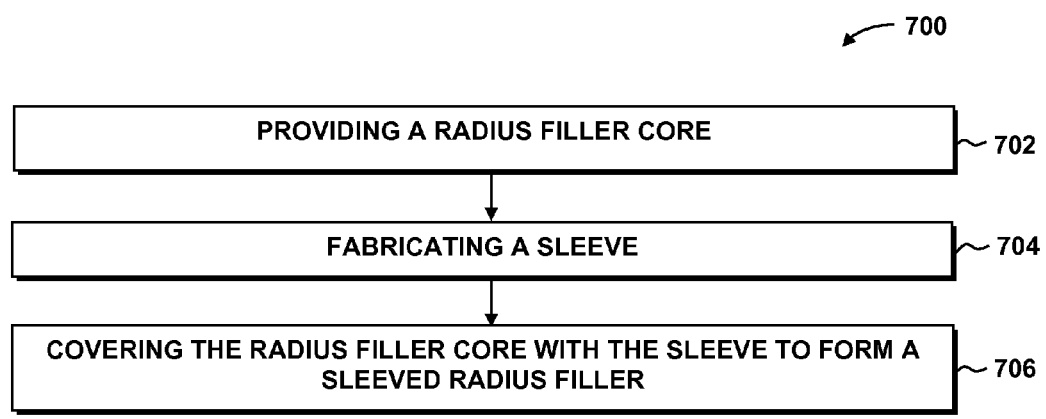
FIG. 43 is a flowchart illustrating one or more operations that may be included in a method of manufacturing a sleeved radius filler.

Referring to FIG. 43, shown is a flowchart having one or more operations that may be included in a method 700 of manufacturing a sleeved radius filler 260. Step 702 of the method may include providing a radius filler core 266 as shown in FIG. 44. In some embodiments, the radius filler core 266 may be provided with a size, shape, and/or configuration that substantially matches the radius filler region 158 of the composite laminate with which the sleeved radius filler 260 may be assembled (e.g., FIGS. 3 and 22). In some examples, the radius filler core 266 may be a non-braided core and may be formed of fibers 308 such as thermoplastic or thermosetting prepreg unidirectional tape which may be stacked or layered. The fibers 308 of the radius filler core 266 may be similar to the fibers 308 of the sleeve.

In some examples, the radius filler core 266 may be comprised of chopped fibers or short fibers embedded within a thermoplastic resin matrix or thermosetting resin matrix. Advantageously, chopped fibers or short fibers may be oriented in a variety of directions which may minimize the coefficient of thermal expansion of the radius filler in a transverse direction (e.g., normal to the long axis) and thereby reduce thermal shrinkage in the transverse direction during cool-down from curing or solidifying of the radius filler. In this regard, a radius filler core 266 formed of chopped fibers or short fibers may have reduced shrinkage relative to the amount of shrinkage that may occur in a conventional radius filler having axial fibers extending along the length of the conventional radius filler. Advantageously, reduced shrinkage in the transverse direction may result in reduced interlaminar stresses at the interface between the radius filler side surfaces 232 and the stiffener laminates 162 and may thereby reduce the propensity for cracking. In some embodiments, a triangular cross-sectional shape radius filler core 266 may be formed of short fibers or chopped fibers by extruding, casting, or rolling the radius filler core 266 into the desired shape. In other embodiments, the radius filler core 266 may be formed of foam, metallic or non-metallic tubing or rod, or other material. Metallic material of a radius filler core 266 may include titanium, aluminum, steel, or other alloys. Non-metallic materials of a radius filler core 266 may include ceramic material and polymeric material.

In some embodiments, the radius filler core 266 may be formed of material having a specific functionality in addition to the radius filler core 266 assisting in transferring loads between the base laminate 172 and the stiffener laminates 162. For example, the radius filler core 266 may be formed of conductive material for conducting electricity such as for dissipating static charge buildup within a composite structure 106. In other embodiments, the radius filler core 266 may be formed of material that functions as a conduit for communication or data transmission. In still other embodiments, the radius filler core 266 may be selected of material that provides acoustic damping to a composite structure 106 as indicated above.

Step 704 of the method 700 of FIG. 43 may include fabricating a sleeve for the sleeved radius filler 260. In some embodiments, the sleeve may be fabricated as a hollow braided tube 264 having a cylindrical shape as shown in FIG. 45. In other embodiments, the sleeve may be braided in a hollow triangular shape (not shown) that may approximate the shape of the radius filler core 266. As indicated above, the fibers 308 of a braided sleeve 262 may be formed of the same material as the fibers 308 of the radius filler core 266.

Step 706 of the method 700 of FIG. 43 may include covering the radius filler core 266 with a sleeve to form a sleeved radius filler 260 as shown in FIG. 46. For example, some embodiments may include braiding fibers 308 over the radius filler core 266 to form a braided sleeve 262 covering the radius filler core 266. The assembled radius filler and sleeve may then be consolidated and/or cured to form the sleeved radius filler 260. Other embodiments may include braiding fibers 308 over a dummy radius filler 438. For example, the dummy radius filler 438 may be formed of any suitable material including, but not limited to, a foam core, an inflatable core, a soluble core, or an otherwise removable core. After the sleeve is formed, the method may include removing the dummy radius filler 438 from the braided sleeve 262, and then pulling the braided sleeve 262 over the radius filler core 266. The sleeved radius filler 260 may then be installed in a radius filler region 158 to form a laminate assembly 176 similar to that which is illustrated in FIG. 47.

Figure 48:
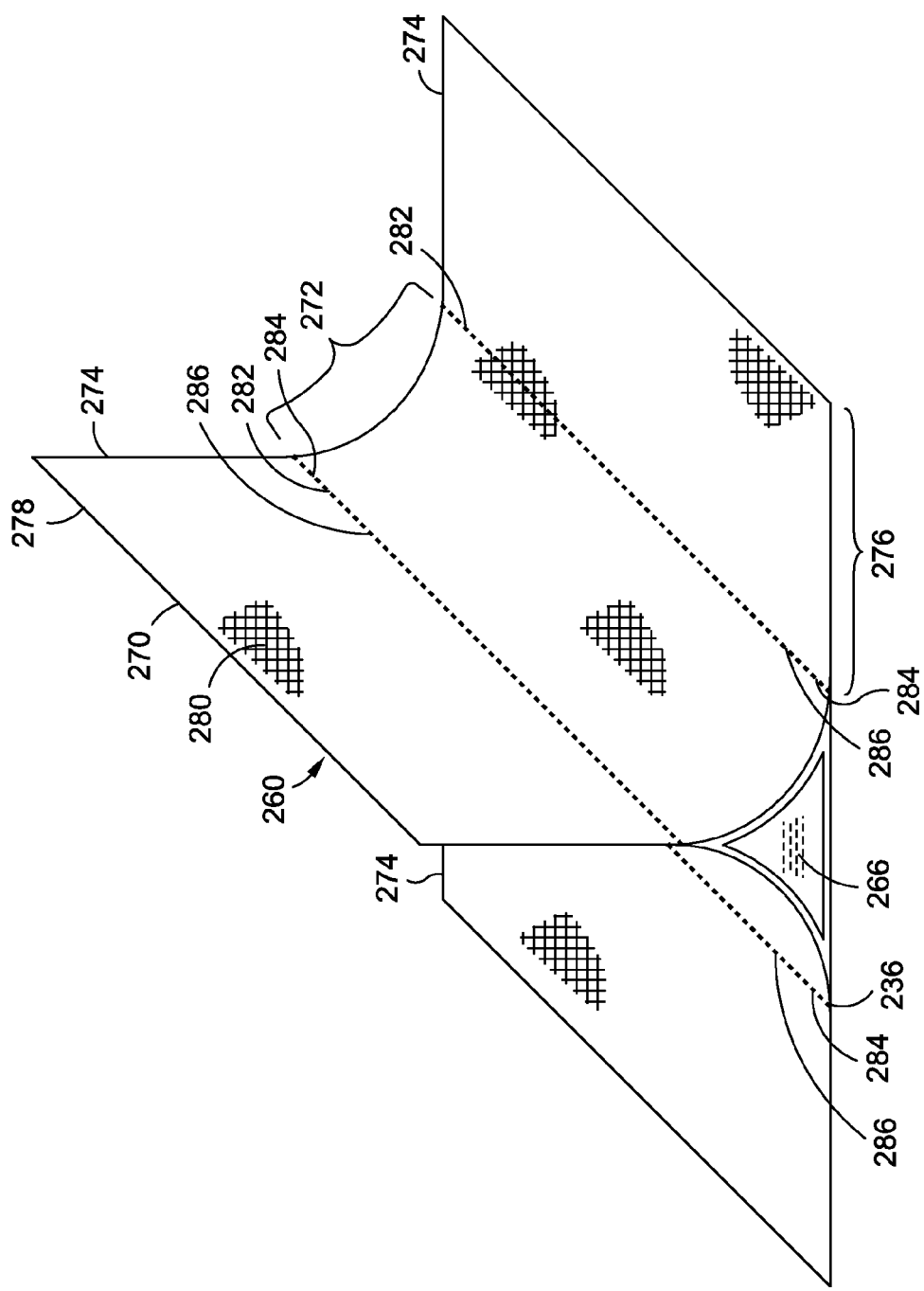
FIG. 48 is a perspective view of an embodiment of a sleeved radius filler having a legged sleeve formed of woven material.

In some embodiments, the method may include fabricating the sleeve as a legged sleeve 270 as shown in FIG. 48. The legged sleeve 270 may have at least one leg 274 extending outwardly from a main sleeve portion 272. The leg 274 of the legged sleeve 270 may extend along a length of the main sleeve portion 272. The legged sleeve 270 may be configured such that one or more legs 274 intersects the main sleeve portion 272 at one or more of the radius filler corners 236 of the radius filler. In some embodiments, the legged sleeve 270 may be formed in a generally triangular cross-sectional shape similar to the shape of the radius filler core 266.

FIG. 48 illustrates a sleeve with three legs 274 extending outwardly from each one of three radius filler corners 236. The legged sleeve 270 may be configured such that at least one of the legs 274 has a leg width 276 that is at least as wide as the radius filler base surface 234 and/or a radius filler side surface 232. However, the legs 274 may be provided in any width 276, without limitation. Furthermore, the legged sleeve 270 may be provided in an asymmetric configuration wherein one of the legs 274 may be less wide than one or both of the remaining legs 274. In some embodiments, the method of fabricating the sleeve may include braiding fibers 308 into a legged sleeve 270 wherein the legs 274 and the main sleeve portion 272 are braided as a unitary structure 288 (not shown). In this regard, the legged sleeve 270 may be fabricated such that the juncture 284 of each leg 274 with the main sleeve portion 272 is seamless.

In other embodiments, the method may include assembling the sleeve from woven material 280 to form a woven sleeve 278. For example, FIGS. 48-50 illustrate a legged sleeve 270 formed of woven material 280. The method of fabricating the legged sleeve 270 may include using through-thickness stitching 282 to connect at least one leg 274 to the main sleeve portion 272 along a length of the sleeve. The through-thickness stitching 282 may be installed along the radius filler corner 236 of the main sleeve portion 272 as shown in FIG. 48. In this regard, FIG. 48 illustrates an assembled legged sleeve 270 covering a radius filler core 266 and showing the through-thickness stitching 282 connecting each leg 274 to the main sleeve portion 272 at each one of the radius filler corners 236. Advantageously, the through-thickness stitching 282 at the radius filler corners 236 may reduce or prevent delamination at the radius filler corners 236 of an assembled composite structure 106.

FIG. 51 illustrates a legged sleeve 270 braided around a dummy radius filler 438 having a cylindrical cross-sectional shape. The braided sleeve 262 includes a main sleeve portion 272 and three legs 274 extending outwardly from the main sleeve portion 272 and integrally formed with the main sleeve portion 272. In this regard, the braided sleeve 262 is formed as unitary structure 288. The legs 274 are joined to the main sleeve portion 272 at a location such that when the sleeve is pulled over the radius filler core 266, the juncture 284 of each leg 274 with the main sleeve portion 272 is located at one of the corners of the radius filler core 266 as shown in FIG. 53.

FIG. 52 illustrates a legged sleeve 270 braided over a dummy radius filler 438 having a triangular cross-sectional shape. The dummy radius filler 438 is sized and configured such that the juncture 284 of the legs 274 with the main sleeve portion 272 coincides with the location of the radius filler corners 236 as shown in FIG. 53. FIG. 53 illustrates a sleeved radius filler having a legged sleeve installed over a radius filler core 266. The legged sleeve 270 may be formed as a braided sleeve 262.

FIG. 54 is an exploded view of a sleeved radius filler 260 assembled with a pair of stiffener laminates 162 and a base laminate 172. Each leg 274 of the sleeved radius filler 260 may be joined to the main sleeve portion 272 at a nodal joint 286 located at a corner of the radius filler. In an embodiment, each nodal joint 286 may comprise through-thickness stitching 282 or other joining mechanism for joining the leg 274 to the main sleeve portion 272.

FIG. 55 illustrates the assembly of the stiffener laminates 162 with the base laminate 172 capturing the sleeved radius filler 260 therebetween. The through-thickness stitching 282 in the sleeved radius filler 260 is coincident with the tangent points 156 of the flanges 168 on each stiffener laminate 162. Ideally, the through-thickness stitching 282 has minimal thickness in order to allow the flange faying surfaces 170 to be placed in abutting contact with the faying surface 174 of the base laminate 172 for bonding the laminates together during co-curing or co-consolidation of the laminates.

FIG. 56 illustrates a further embodiment of a composite structure 106 wherein the vertical leg 274 of a lower radius filler is common to the vertical leg 274 of an upper radius filler. The interconnection of the lower and upper radius filler may improve the pulloff load 178 capability of the composite stiffener 152. In addition, FIG. 56 illustrates the horizontal legs 274 of the lower radius filler being longer than the horizontal legs 274 of the upper radius filler. The increased length of the horizontal legs 274 of the lower radius filler may provide improved pulloff load 178 capability of the lower flanges 168 with the lower base laminate 172. It should be noted that the legged radius filler may not necessarily be provided with symmetrical legs 274. For example, a leg 274 on one side of a radius filler may be longer than a leg 274 on an opposite side of the radius filler.

Advantageously, the radius filler having a legged sleeve 270 may reduce the propensity for delamination or disbonding at the interface between the radius filler and the laminate plies. In this regard, the radius filler with legged sleeve 270 may act as a truss interconnecting the laminates and may thereby reduce stress in the radius filler region 158 at the radius filler corners 236. In addition, the radius filler with legged sleeve 270 may spread out or distribute the load being transferred between the webs 166 and the flanges 168 of the stiffener laminates 162. In this regard, the legged sleeve 270 may prevent localized concentrations of stress in the radius filler region 158. In addition, the legged sleeve 270 may accommodate thermal expansion mismatch between the radius filler region 158 and the adjacent laminates such as during shrinkage after cool-down from curing or consolidating of the composite laminates that make up the composite structure 106.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a consolidated radius filler, the method comprising the steps of:
    providing a plurality of fibers including resin;
    braiding the plurality of fibers to form a braided preform;
    shaping the braided preform into a braided radius filler having opposing radius filler side surfaces, wherein the fibers of the braided radius filler include resin either before or after the braiding;
    mounting the braided radius filler in a mandrel die cavity of a mandrel forming system having a mandrel forming base;
    injecting a ceramic matrix into the mandrel die cavity containing the braided radius filler;
    hardening the injected ceramic matrix; and
    heating the hardened ceramic matrix to cause expansion of the hardened matrix against the radius filler side surfaces to form the consolidated radius filler.

2. The method of claim 1, wherein the step of shaping the braided preform includes:
    shaping the braided radius filler into a substantially triangular cross-sectional shape having the opposing radius filler side surfaces and a radius filler base surface, the radius filler side surfaces each being concave, and the radius filler base surface being substantially planar.

3. The method of claim 1, wherein the plurality of provided fibers comprise prepreg composite tape containing the resin.

4. The method of claim 3, wherein the step of shaping the braided preform into the braided radius filler includes:
    heating the prepreg composite tape of the braided preform;
    softening and intermingling the resin in the prepreg composite tape in response to the heating; and
    curing the resin after forming the consolidated radius filler.

5. The method of claim 1, wherein the step of braiding the plurality of fibers comprises:
    braiding the plurality of fibers into a braided preform having a triangular cross-sectional shape approximating a final shape of the braided radius filler.

6. The method of claim 1, wherein the step of braiding the plurality of fibers comprises:
    braiding the plurality of fibers around an inner core to form the braided preform comprising the plurality of fibers and the inner core.

7. The method of claim 6, wherein:
    the inner core is formed of a material functioning as a conduit for communication signals or data signals.

8. The method of claim 6, wherein:
    the inner core has one of a generally cylindrical shape and a generally triangular shape.

9. The method of claim 1, wherein:
    the braided preform has a non-hollow cross-section.

10. The method of claim 1, wherein the step of providing the plurality of fibers comprises:
    providing the plurality of fibers as dry fibers; and
    wetting the dry fibers in a resin bath of the resin during at least one of:
        prior to braiding into the braided preform; and
        following braiding into the braided preform.

11. The method of claim 1, further including:
    internally braiding one or more heater wires into the braided preform during the braiding of the plurality of fibers; and
    resistively heating the heater wires to soften the resin during at least one of:
        prior to consolidation of the braided radius filler; and
        during consolidation of the braided radius filler.

12. The method of claim 1, further comprising the step of:
    clamping the mandrel forming system within a press system prior to the expansion of the hardened ceramic matrix.

13. The method of claim 12, wherein the ceramic matrix is provided as one of a slurry and a semi-liquid composition.

14. The method of claim 12, wherein the step of clamping the mandrel forming system within the press system comprises:
    clamping the mandrel forming system between a movable upper press and a press base of the press system.

15. The method of claim 12, further comprising:
    applying heat to the mandrel forming system for heating the ceramic matrix by placing the press system in an autoclave or an oven.

16. The method of claim 1, further comprising the steps of:
    removing the braided radius filler from the mandrel die cavity;
    applying a solvent to the hardened ceramic matrix; and
    solubilizing the hardened ceramic matrix to remove the hardened ceramic matrix from the mandrel die cavity.

17. The method of claim 1, wherein the step of injecting the ceramic matrix into the mandrel die cavity comprises:

injecting the ceramic matrix into one or more ports in the mandrel die until excess ceramic matrix starts flowing out of at least one additional port in the mandrel die.

18. The method of claim 17, further comprising:
curing the consolidated radius filler.

19. The method of claim 18, further comprising:
cutting the consolidated radius filler to a desired length after curing.

20. The method of claim 17, further comprising:
closing off the one or more ports and the at least one additional port with plugs after the ceramic matrix starts flowing out of the at least one additional port.

* * * * *